US011978581B2

(12) United States Patent
Francis et al.

(10) Patent No.: US 11,978,581 B2
(45) Date of Patent: May 7, 2024

(54) SURFACE-MOUNTED MAGNETIC-COMPONENT MODULE

(71) Applicant: Murata Manufacturing Co., Ltd., Nagaokakyo (JP)

(72) Inventors: Lee Francis, Milton Keynes (GB); William Jarvis, Milton Keynes (GB); Takayuki Tange, Milton Keynes (GB); Shouhei Hirose, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 710 days.

(21) Appl. No.: 16/924,666

(22) Filed: Jul. 9, 2020

(65) Prior Publication Data

US 2021/0012952 A1 Jan. 14, 2021

Related U.S. Application Data

(60) Provisional application No. 62/871,849, filed on Jul. 9, 2019.

(51) Int. Cl.
*H01F 27/28* (2006.01)
*H01F 17/06* (2006.01)
*H01F 27/255* (2006.01)

(52) U.S. Cl.
CPC ....... *H01F 27/2895* (2013.01); *H01F 17/062* (2013.01); *H01F 27/255* (2013.01); *H01F 27/2828* (2013.01)

(58) Field of Classification Search
CPC .. H01F 27/2895; H01F 17/062; H01F 27/255; H01F 27/2828; H01F 27/022; H01F 2027/2814; H01F 27/2804
USPC ........................................ 336/229, 221, 212
See application file for complete search history.

(56) References Cited

U.S. PATENT DOCUMENTS 4,103,267 A * 7/1978 Olschewski ........... H05K 1/165 336/200
6,249,039 B1 * 6/2001 Harvey ............... H01F 17/0033 257/528
2008/0197956 A1 * 8/2008 Hasegawa ............ H01F 27/363 336/61
2009/0160595 A1 * 6/2009 Feng ................. H01L 23/49861 336/200
2015/0213938 A1 * 7/2015 Sakaguchi ............. H01F 27/28 206/408
2016/0181003 A1 * 6/2016 Li ......................... H01F 17/062 336/200

OTHER PUBLICATIONS

Francis, "Surface-Mounted Magnetic-Component Module", U.S. Appl. No. 17/568,853, filed Jan. 5, 2022.

(Continued)

*Primary Examiner* — Bickey Dhakal
*Assistant Examiner* — Kazi S Hossain
(74) *Attorney, Agent, or Firm* — Keating & Bennett, LLP

(57) ABSTRACT

A magnetic-component module includes a substrate, a core on a first surface of the substrate, a spacer on the core, a gap between a bottom surface of the core and the first surface of the substrate, a winding including wire bonds extending over the core and electrically connecting a first portion of the substrate and a second portion of the substrate, and traces on and/or in the substrate, and an overmold material encapsulating the core, the spacer, and the wire bonds and filling the gap.

13 Claims, 22 Drawing Sheets

(56) References Cited

OTHER PUBLICATIONS

Francis, L. et al.; "Surface-Mounted Magnetic-Component Module"; U.S. Appl. No. 16/924,240; filed Jul. 9, 2020.
Francis, L. et al.; "Surface-Mounted Magnetic-Component Module"; U.S. Appl. No. 16/924,668; filed Jul. 9, 2020.
Francis, L. et al.; "Surface-Mounted Magnetic-Component Module"; PCT Application No. PCT/US2020/041349; filed Jul. 9, 2020.
Francis, L. et al.; "Surface-Mounted Magetic-Component Module"; PCT Application No. PCT/US2020/041351; filed Jul. 9, 2020.

* cited by examiner

SURFACE-MOUNTED MAGNETIC-COMPONENT MODULE

CROSS REFERENCE TO RELATED APPLICATIONS

This application claims the benefit of U.S. Patent Application No. 62/871,849 filed on Jul. 9, 2019. The entire contents of this application are hereby incorporated by reference.

BACKGROUND OF THE INVENTION

1. Field of the Invention

The present invention relates to magnetic components and magnetic-component modules, and in particular, to transformers and surface-mounted transformer modules.

2. Background

Transformers are used in many applications, for example, to change the voltage of input electricity. A transformer has one or more primary windings and one or more secondary windings wound around a common core of magnetic material. The primary winding(s) receive electrical energy, such as from a power source, and couples this energy to the secondary winding(s) by a changing magnetic field. The energy appears as an electromagnetic force across the secondary winding(s). The voltage produced in the secondary winding(s) is related to the voltage in the primary winding(s) by the turns ratio between the primary and secondary windings. Typical transformers are implemented using an arrangement of adjacent coils. In a toroidal transformer, the windings wind around a toroid-shaped core.

Demands in many fields, including telecommunications, implantable medical devices, and battery-operated wireless devices, for example, have prompted design efforts to minimize the size of components with lower-cost solutions that exhibit the same or better performance but operate with reduced power consumption. The reduced power consumption is often prompted by further requirements in lowering supply voltages to various circuits. Accordingly, there is a continuing need to provide more efficient, smaller, and lower cost transformers.

SUMMARY OF THE INVENTION

To overcome the problems and satisfy the needs described above, preferred embodiments of the present invention provide magnetic-component modules each including a core on a substrate with a gap between the core and the substrate, a spacer arranged over the core, and wire bonds extending over the spacer and the core.

According to a preferred embodiment of the present invention, a magnetic-component module includes a substrate; a core on a first surface of the substrate; a spacer on the core; a gap between a bottom surface of the core and the first surface of the substrate; a winding including wire bonds extending over the core and electrically connecting a first portion of the substrate and a second portion of the substrate, and traces on and/or in the substrate; and an overmold material encapsulating the core, the spacer, and the wire bonds and filling the gap.

Electrical components can be attached to a second surface of the substrate that is opposite to the first surface of the substrate. The spacer can conform to a top of the core. An edge of the spacer can overhang the core. The spacer can extend over an entire outer surface of the core or over substantially the entire outer surface of the core.

The magnetic-component module can further include a lead frame that supports the core and that electrically connects the winding to the substrate, where the overmold material encapsulates a portion of the lead frame. The lead frame can be configured such that electrical components are located on the substrate under the lead frame.

The magnetic-component module can further include an adhesive to mount the core to the substrate. The adhesive can be in the gap between the core and the substrate, and the overmold material can encapsulate the adhesive. The spacer can include a polyethylene terephthalate (PET) resin.

According to a preferred embodiment of the present invention, a voltage converter circuit includes the magnetic-component module according to one of the various preferred embodiments of the present invention.

According to a preferred embodiment of the present invention, a gate drive switching circuit includes the voltage converter circuit according to one of the various preferred embodiments of the present invention.

According to a preferred embodiment of the present invention, a motor control circuit includes the gate drive switching circuit according to one of the various preferred embodiments of the present invention.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
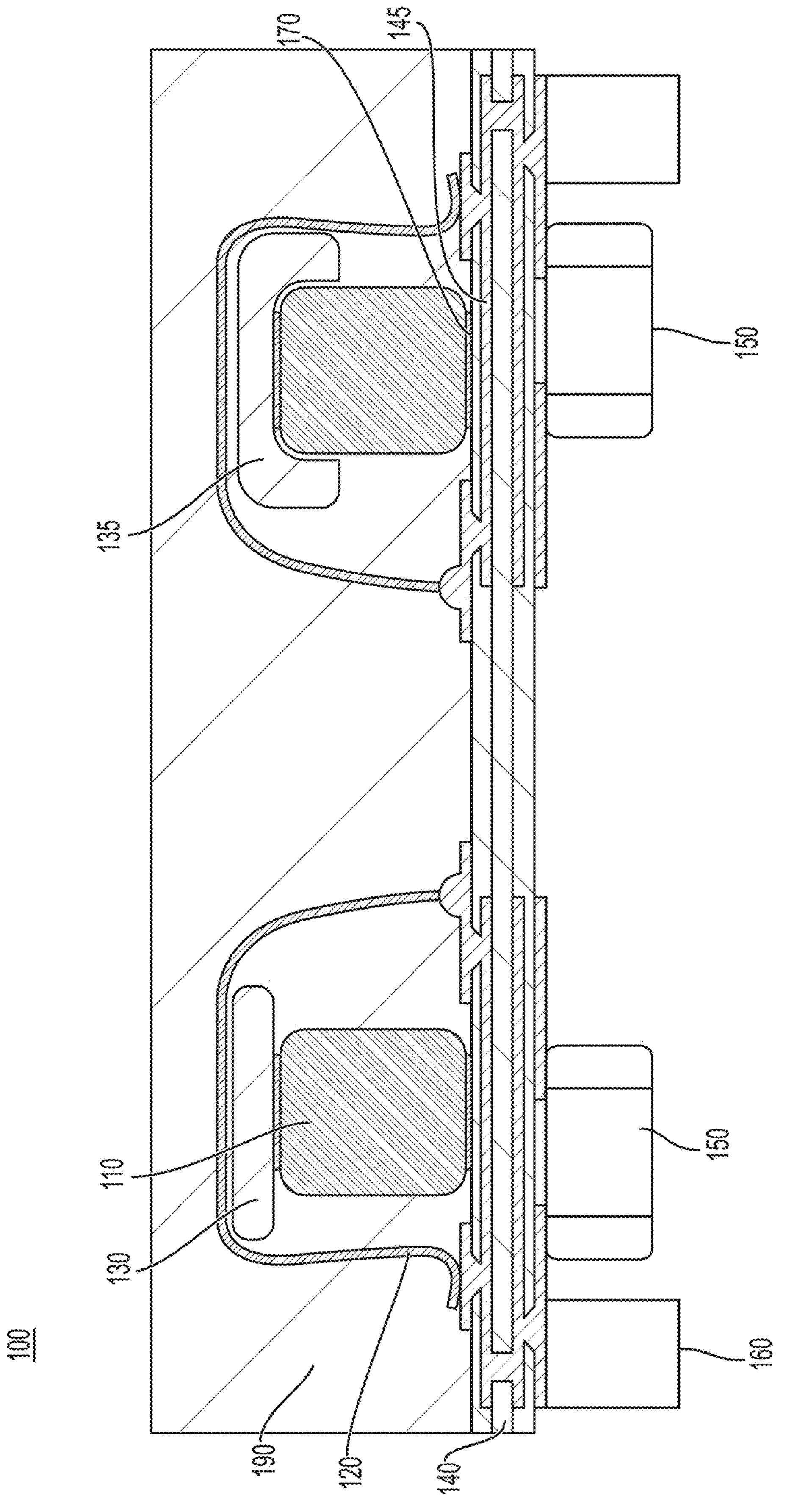
FIG. 1 shows a magnetic-component module with a spacer attached to a core.

FIG. 1 shows a magnetic-component module 100 with a core 110, winding(s) that are defined by wire bonds 120 and traces 145, a spacer 130, and a substrate 140, such as a multilayer printed circuit board (PCB). An overmold material 190 can cover or encapsulate the core 110, the wire bonds 120, and the spacer 130. The magnetic-component module 100 can be a transformer with primary and secondary windings that extend around the core 110, as shown in FIG. 1. Although FIG. 1 shows a transformer with two windings, other magnetic components can also be used, including, for example, an inductor with a single winding or a transformer with three or more windings. Circuitry components and/or connectors can be located on the bottom surface of the substrate. As shown in FIG. 1, the magnetic-component module 100 can include surface-mount (SM) or input/output (I/O) pins 160 that are located on the bottom surface of the substrate 140. The magnetic-component module 100 can include electrical components 150 mounted on the bottom surface of the substrate 140. The electrical components 150 can include passive components, such as, capacitors, resistors, etc. and can include active components, such as transistors.

Figure 2:
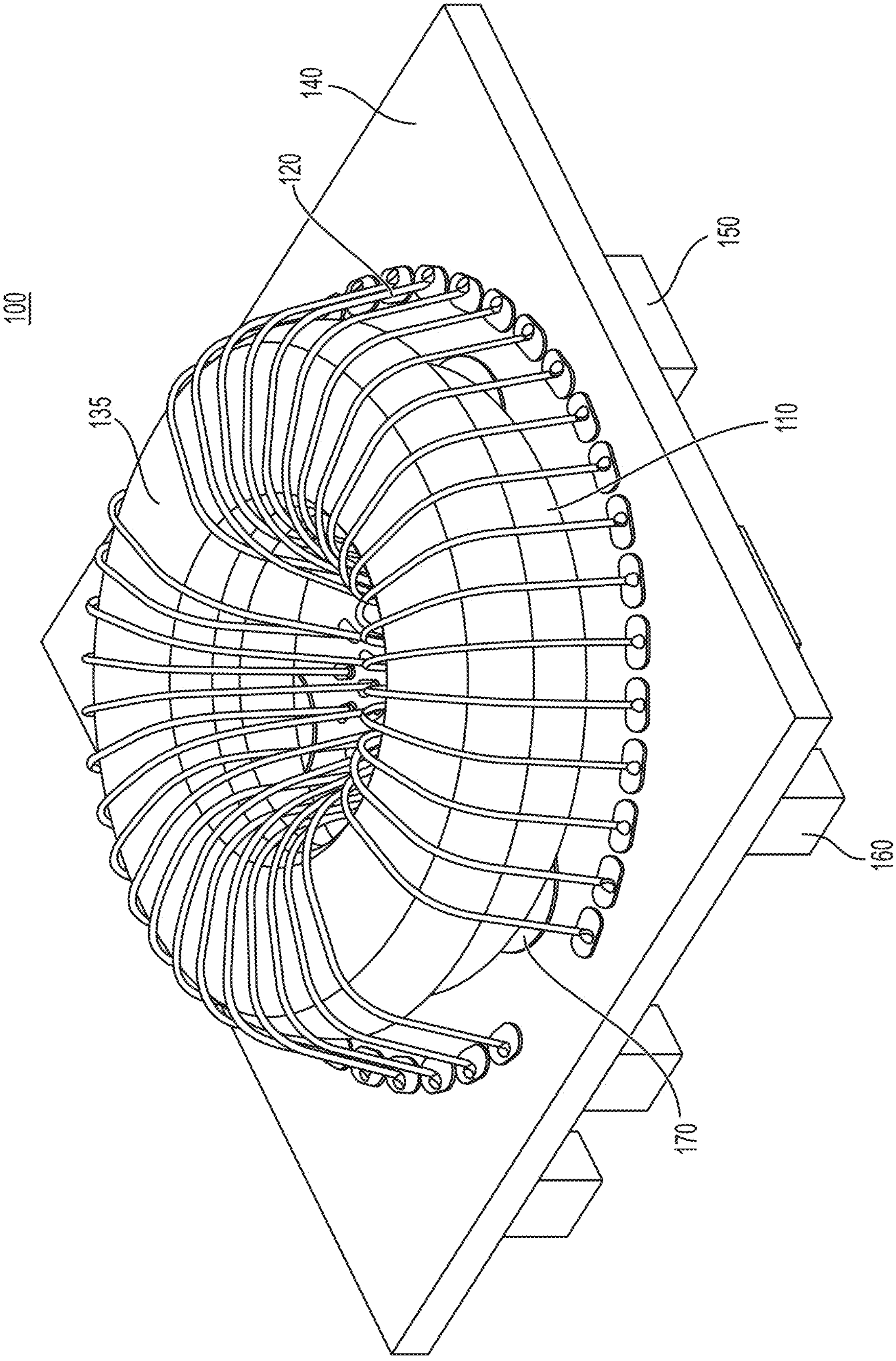
FIG. 2 is a top perspective view of the magnetic-component module of FIG. 1.

The core 110 can be an uninsulated core and can be fixed (i.e., adhered) to the multilayer substrate 140 with adhesive 170. The adhesive 170 can include spaced apart portions along the bottom of the core 110 as shown in FIG. 2 or can extend along the entire bottom of the core 110. The spacer 130 can be an insulated spacer and can be fixed (i.e., adhered) to a top of the core 140. The spacer 130 can be made by an injection molding process. The spacer 130 can be made with any suitable material that can be injection molded, including polyethylene terephthalate (PET) resin. The spacer 130 can help ensure that the wire bonds 120 do not contact the core 110, which would cause the magnetic-component module to short circuit. Although the spacer is shown as a single unitary body in the figures, the spacer can include two or more bodies arranged around the core.

Figure 4:
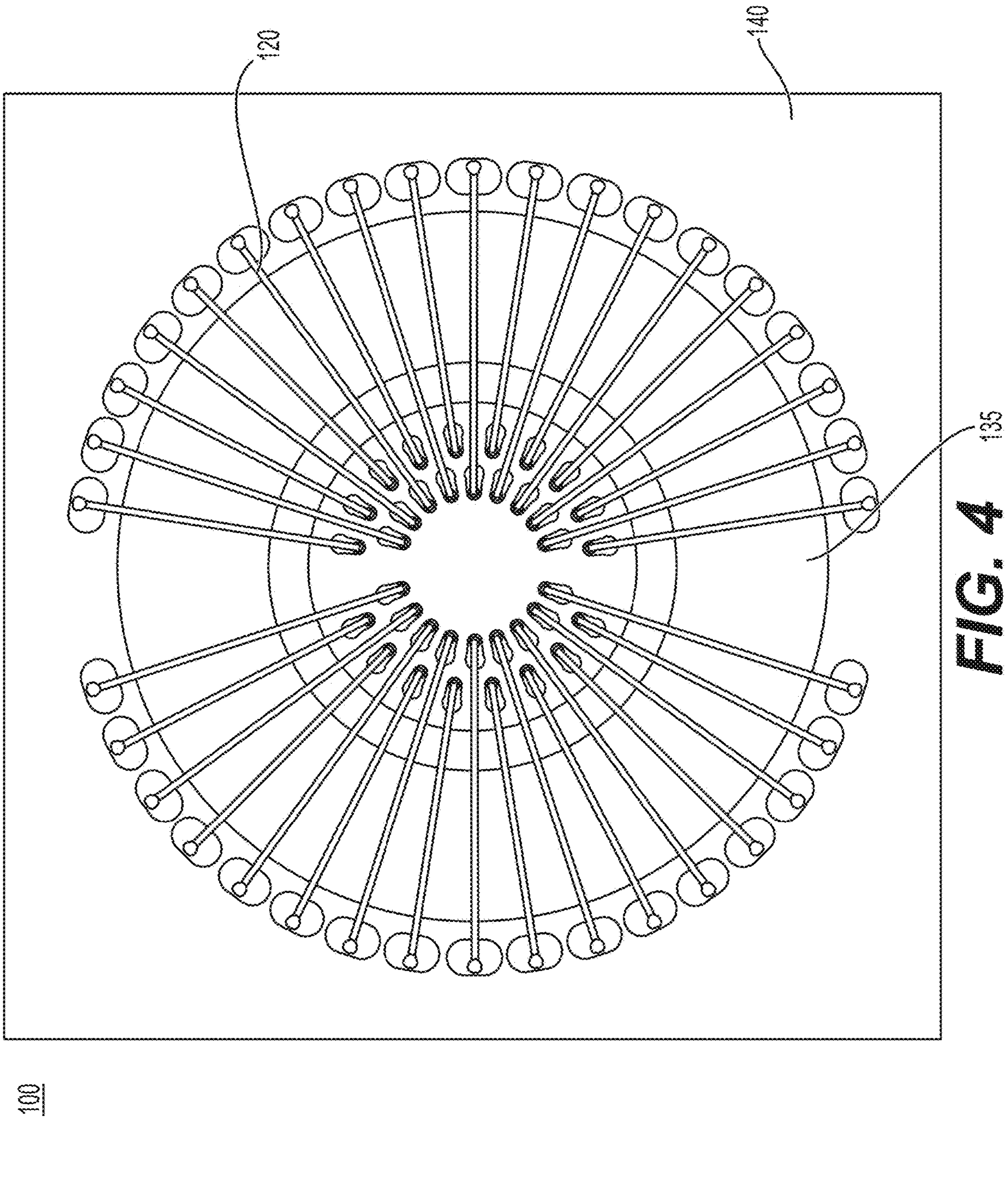
FIG. 4 is a top view of the magnetic-component module of FIG. 1.
Figure 15:
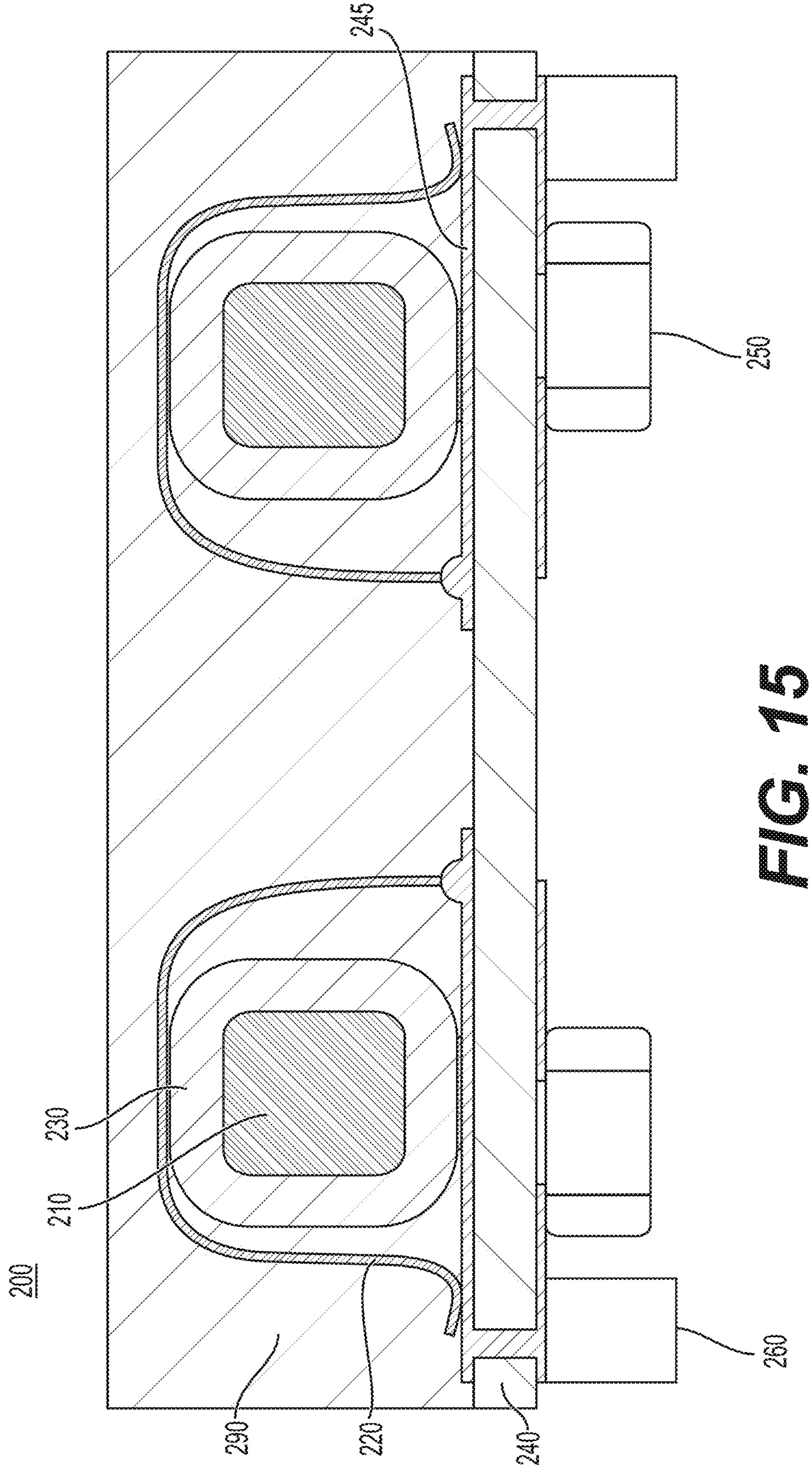
FIG. 15 shows a magnetic-component module with a spacer surrounding a core.

The windings are disposed around the core 110 and include wire bonds 120 that extend over the core 110 and traces 145 on or in the substrate 140 that extend under the core 110. The wire bonds 120 include two ends that are bonded to different portions of the substrate 140. As shown in FIG. 4, the wire bonds 120 can be attached to the substrate 140 in a single row outside of the spacer 135 and in two rows in the interior of the spacer 135. Other arrangements are also possible, including two or more rows outside of the spacer 135 and one row or more than two rows in the interior of the spacer 135. The wire bonds 120 define a top half of a winding. The wire bonds 120 can include copper wires, gold wires, aluminum wires, or any other suitable conductive material. The wire bonds 120 can be attached to the substrate 140 by ball bonding, wedge bonding, compliant bonding, or any other suitable attachment method. The traces 145 can be located on inner or outer layers of the substrate 140 and define a bottom half of the winding. If the core 110 is uninsulated, then the traces 145 can be located on an inner layer or the bottom surface of the substrate 140. If the core 110 is insulated or if the spacer 130 completely surrounds the outer surface of the core 110 as shown in FIG. 15, then the traces 145 can also be on the top surface of the substrate 140.

Figure 3:
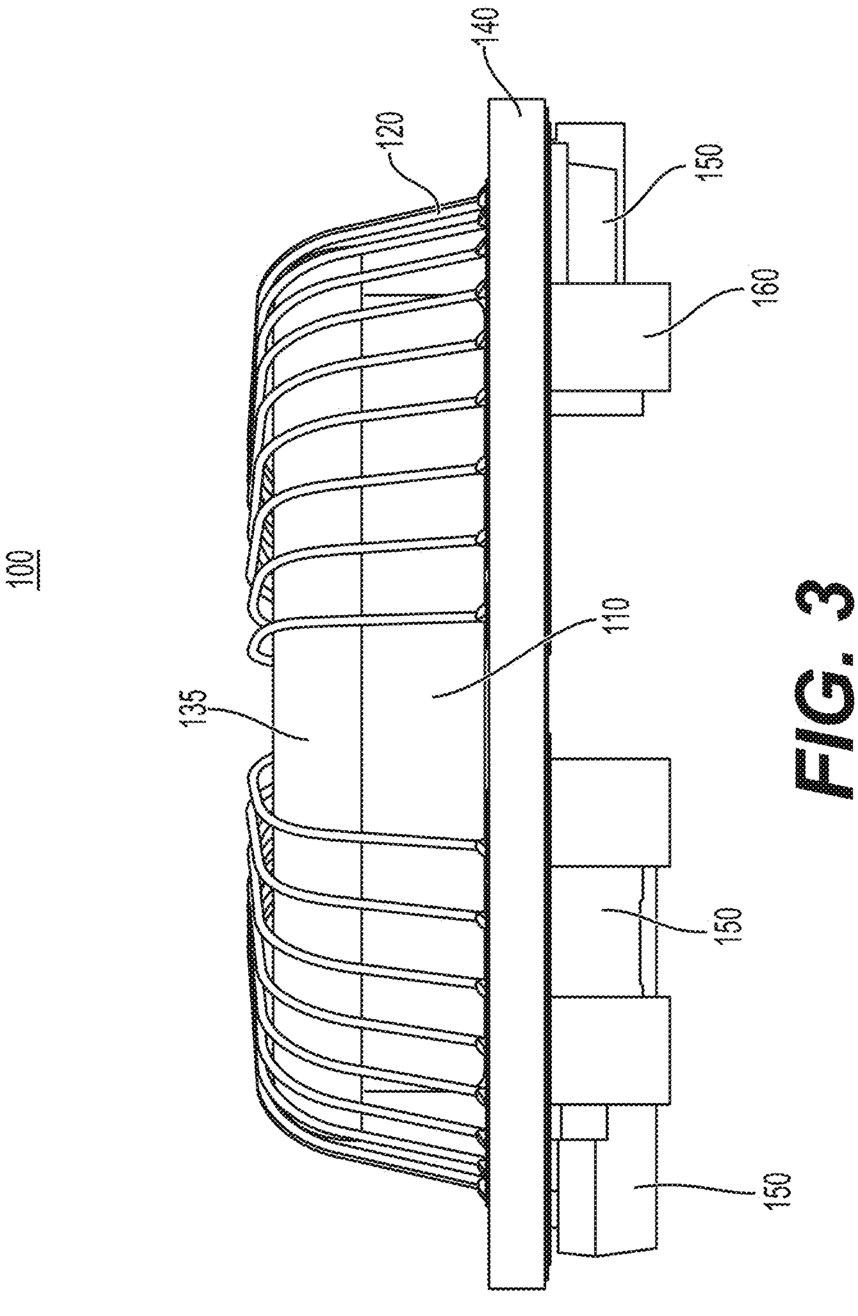
FIG. 3 is a side view of the magnetic-component module of FIG. 1.

The left side of FIG. 1 shows an example of a spacer 130 between the top of the core 110 and the wire bonds 120 to prevent the wire from touching the core 110 and being short-circuited. As shown, the spacer 130 is wider than a width of the core 110 to create an overhang that maintains a predetermined distance between the wire bond 120 and the core 110. The right side of FIG. 1 shows an alternative configuration of the spacer 135 in which the spacer 135 conforms to the top portion of the core 110 and partially covers the side walls of the core 110. It should be understood that, typically, the spacer will have a single cross-sectional shape throughout the spacer and that the two different cross-sectional shapes shown in FIG. 1 are examples of possible cross-sectional shapes. FIGS. 2-4 show a magnetic-component module 100 that uses the spacer 135 that conforms to the top portion of the core 110 and that partially covers the side walls of the core 110, and FIGS. 9-14 show a magnetic-component module that uses the spacer 130 that is wider than the width of the core 110 to create an overhang.

FIG. 1 also shows that the core 110, the spacer 130, and wire bonds 120 can be overmolded with an overmold material 190 to stabilize and protect the components of the magnetic-component module. Instead of overmolding, it is also possible to use a potting method or an encapsulation method to stabilize and protect the components of the magnetic-component module.

FIGS. 2-4 show an example of magnetic-component module 100 with the spacer 135 and without the overmold material 190. FIG. 2 is a top perspective view, FIG. 3 is a side view, and FIG. 4 is a top view. FIGS. 2-4 show views of the spacer 135 having a single cross-sectional shape and conforming to the top portion of the core 110. FIGS. 2-4 show the core 110, the wire bonds 120, the substrate 140, the components 150, the I/O pins 150, and the adhesive 170.

Figure 5:
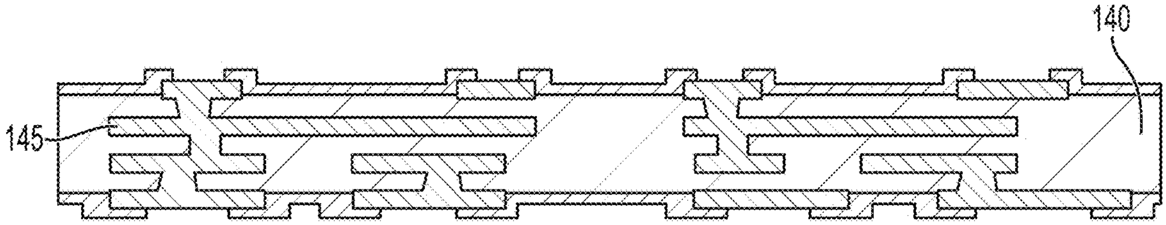
FIGS. 5-14 show steps of a method of manufacturing the magnetic-component module of FIG. 1.
Figure 6:
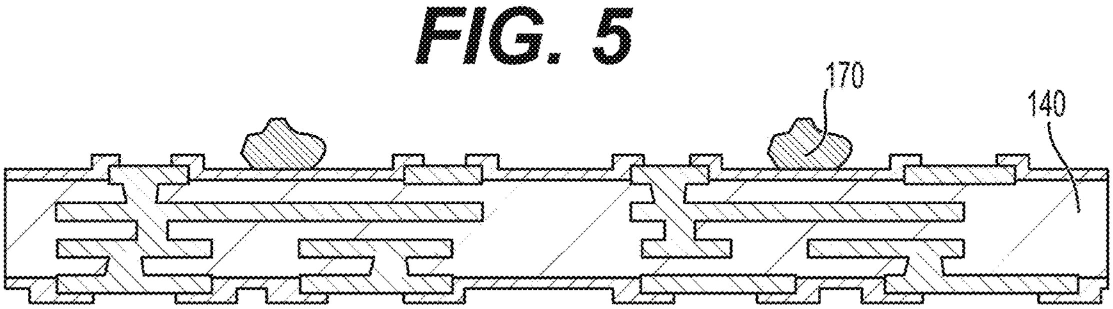
Figure 7:
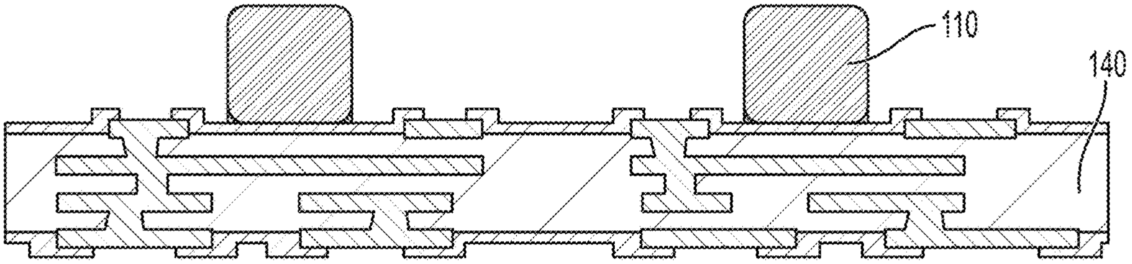
Figure 8:
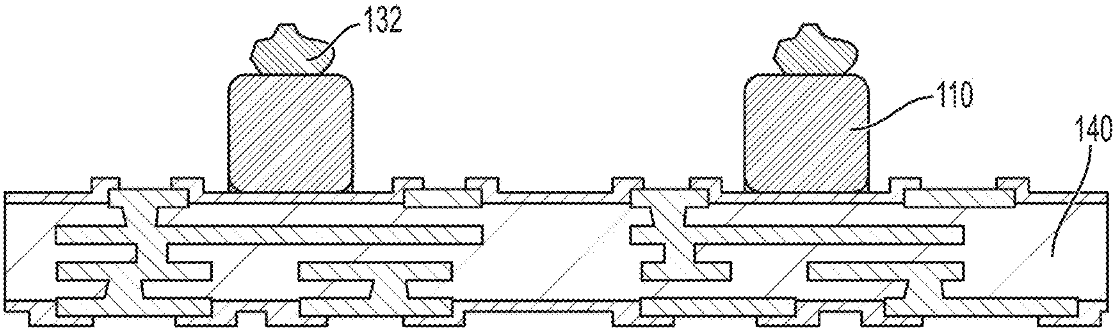
Figure 9:
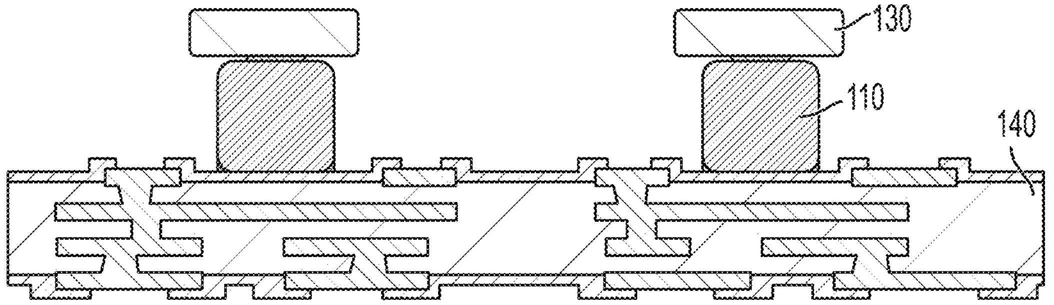
Figure 10:
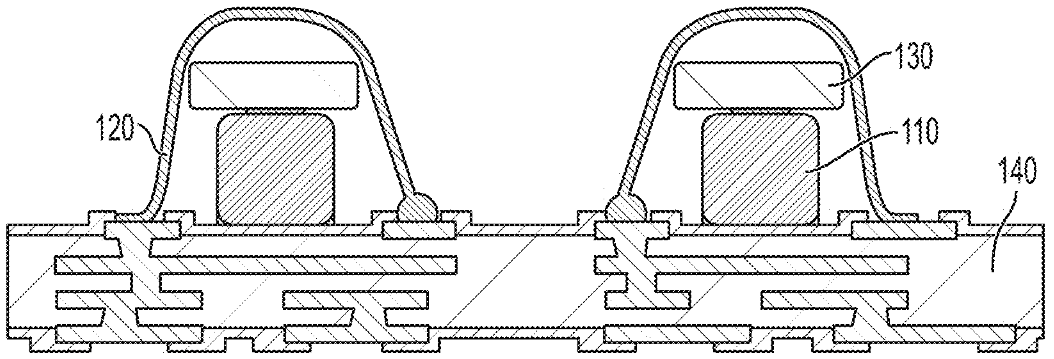
Figure 11:
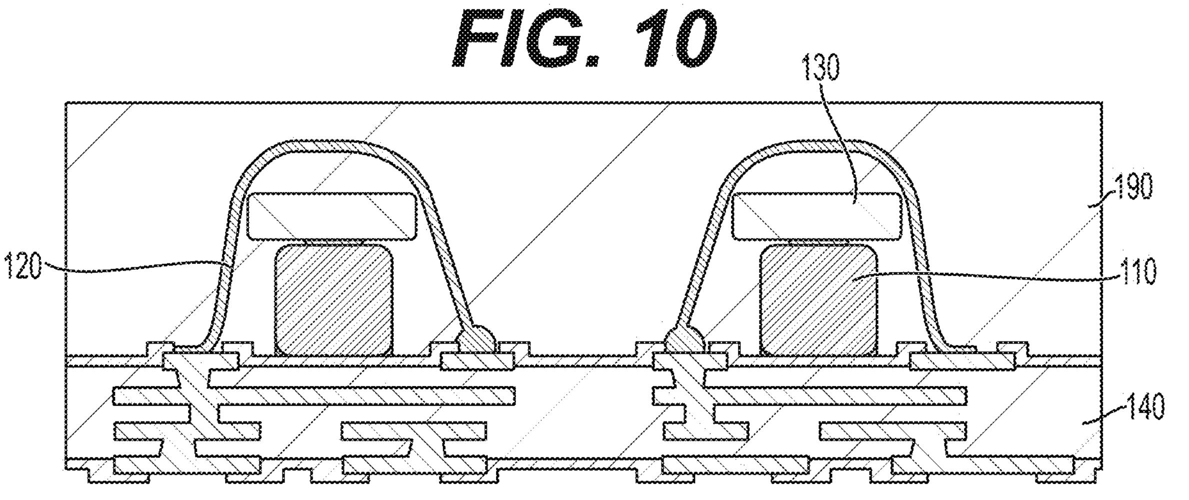
Figure 12:
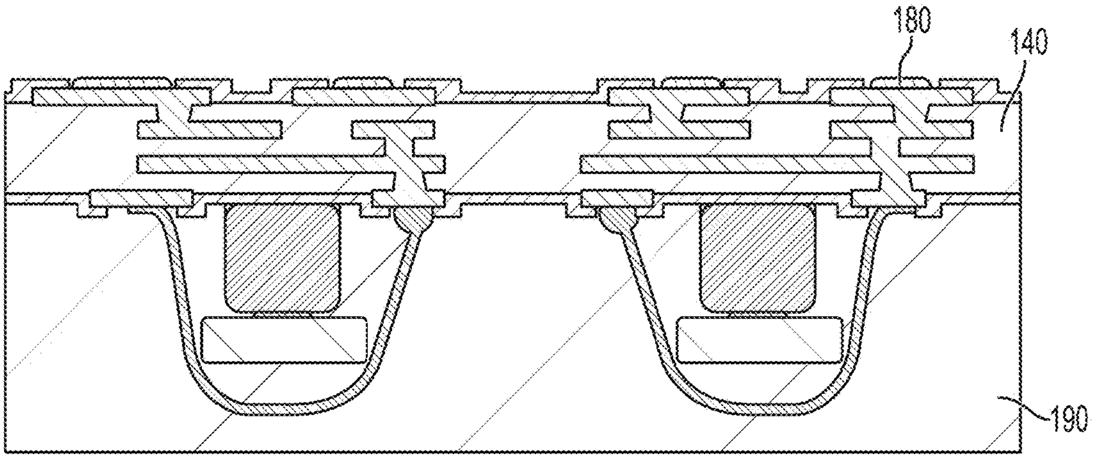
Figure 13:
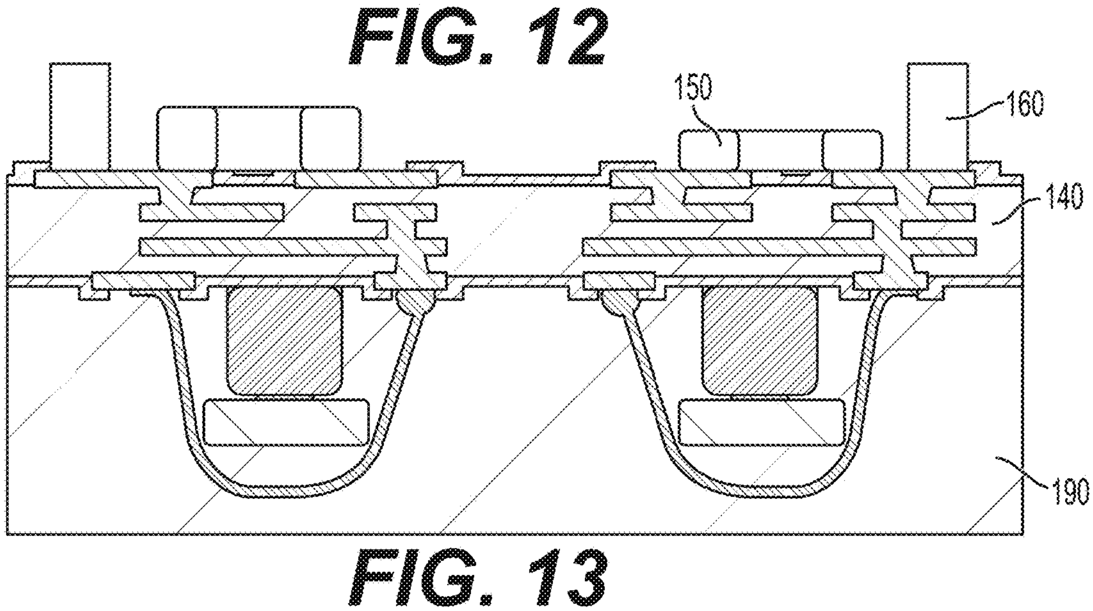
Figure 14:
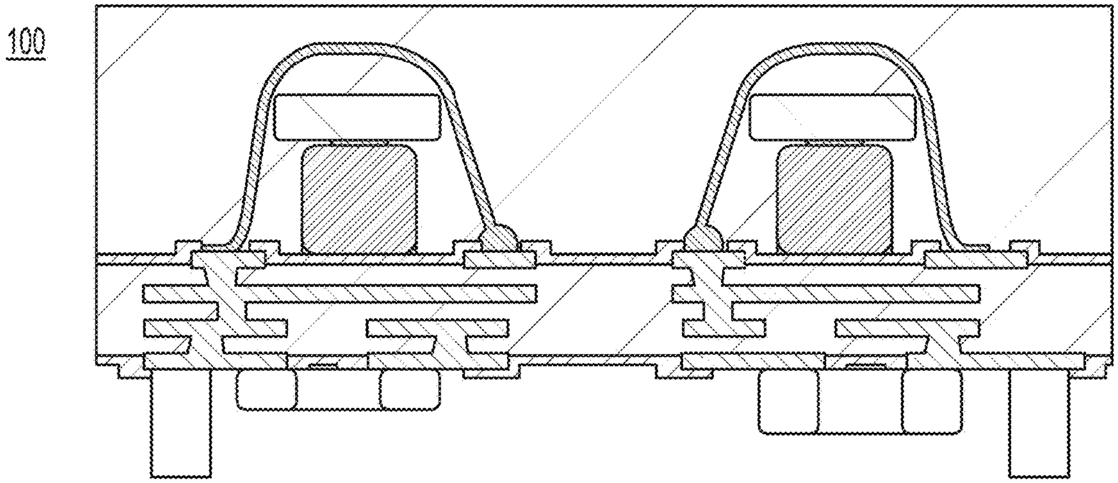

FIGS. 5-14 show steps of a method of manufacturing the magnetic-component module 100 with the spacer 130. FIG. 5 shows that the substrate 140, such as a PCB, can be provided with traces 145 according to conventional techniques. FIG. 6 shows that the adhesive 170 can be deposited on portions of the surface of the substrate 140 on which the core 110 is to be mounted. FIG. 7 shows that the core 110 can be adhered to the substrate 140 where the adhesive 170 was deposited. FIG. 8 shows that an adhesive 132 can be deposited on a top surface of the core 110. FIG. 9 shows that the spacer 130 can be adhered on the top surface of the core 110. FIG. 10 shows that the wire bonds 120 can be formed such that the wire bonds 120 are attached to the substrate 140, extend over the core 110 and the spacer 130, and do not contact the core 110. FIG. 11 shows that an overmold material 190 can be overmolded to cover or encapsulate the core 110, the wire bonds 120, and the 130 spacer. FIG. 12 shows that solder 180 can be deposited on the substrate 140 on the surface opposite to the overmold material 190. FIG. 13 shows that the components 150 and the I/O pins 160 can be mounted on the substrate 140 using the solder 180. FIG. 14 shows the finished magnetic-component module 100 shown in the left side of FIG. 1.

FIG. 15 shows a magnetic-component module 200 with a core 210 that is fixed (i.e., adhered) to a substrate 240. The magnetic-component module 200 includes the core 210, winding(s) that are defined by wire bonds 220 and traces 245, a spacer 230, and a substrate 240. The core 210 is covered on all sides by the spacer 230. As in FIG. 1, wire bonds 220 define the top half of the windings. Traces 245 on the top surface of substrate 240 define the bottom half of the windings. Because the spacer 230 covers the entire outer surface of the core 210, it is not necessary to use a more-expensive multilayer substrate, and it is possible to use a less-expensive substrate 240 with no internal layers. But it is also possible to use a multilayer substrate in which the traces 245 defining the bottom half of the windings are located on the top surface or an internal layer of the multilayer substrate. Circuitry components and/or connectors can be located on the bottom surface of the substrate 240. FIG. 2 also shows that the core 210, the spacer 230, and the wire bonds 220 can be overmolded with overmold material 290. Instead of the spacer 230 extending over the entire outer surface of the core 210, it is also possible that the spacer 230 only extends over substantially the entire outer surface of the core 210. For example, the spacer 230 can extend over substantially the entire outer surface of the core 210 by having a C-shape such that the top and bottom and either the inner or outer side of the core 210 are covered, while either the outer or inner side of the core 210 is exposed. Alternatively, the spacer 230 can extend over substantially the entire outer surface of the core 210 by using two spacers, one that extends over the top of the core 210 and one that extends over the bottom of the core 210.

As shown in FIG. 15, the magnetic-component module 200 can include surface-mount (SM) or input/output (I/O) pins 260 that are located on the bottom surface of the substrate 240. The magnetic-component module 200 can include electrical components 250 mounted on the bottom surface of the substrate 240. The electrical components 250 can include passive components, such as, capacitors, resistors, etc. and can include active components, such as transistors.

Figure 16:
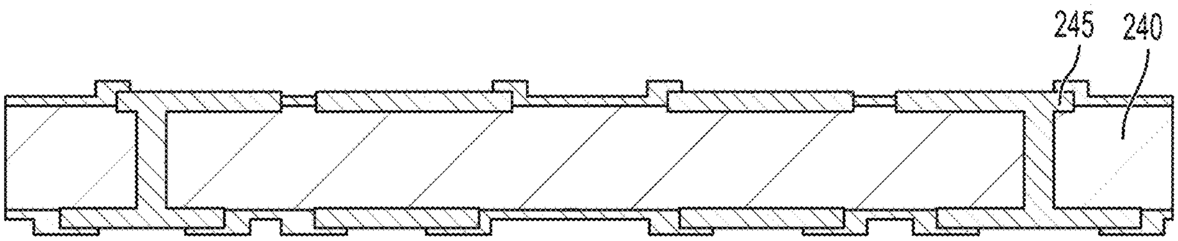
FIGS. 16-23 show steps of a method of manufacturing the magnetic-component module of FIG. 15.
Figure 17:
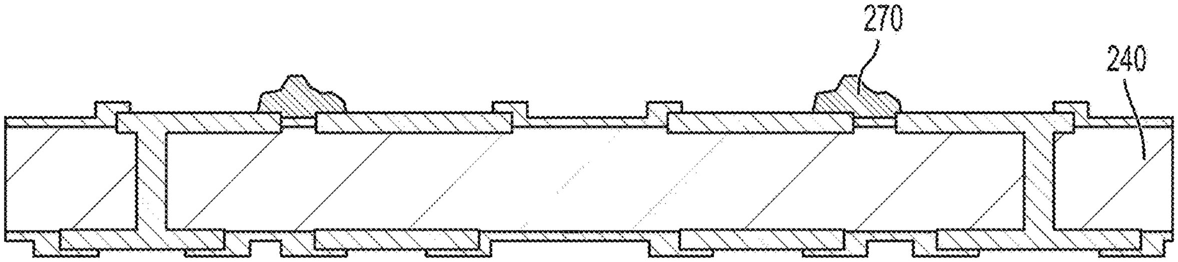
Figure 18:
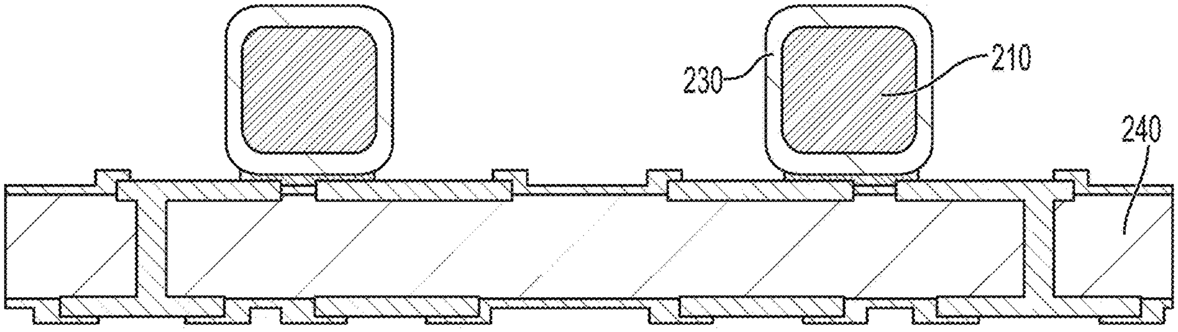
Figure 19:
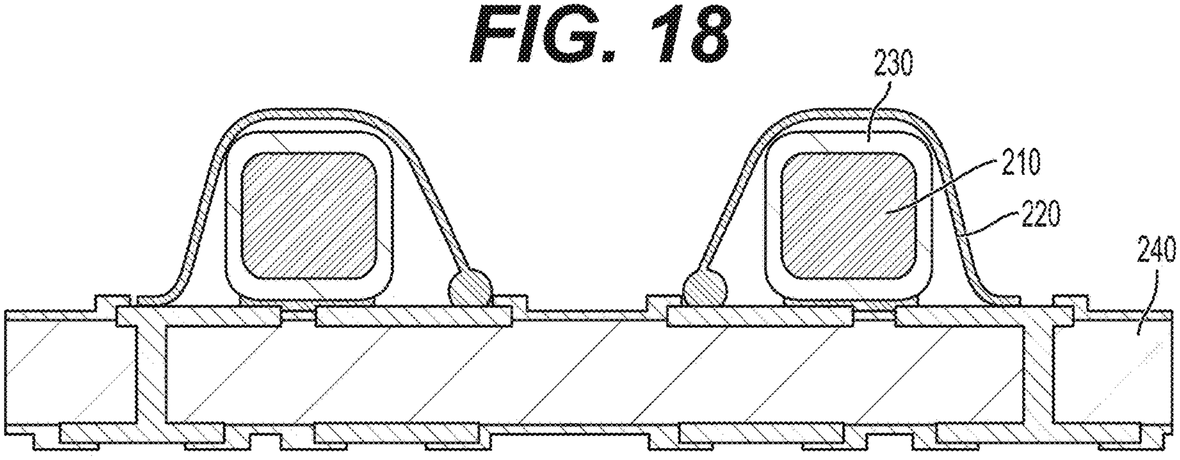
Figure 20:
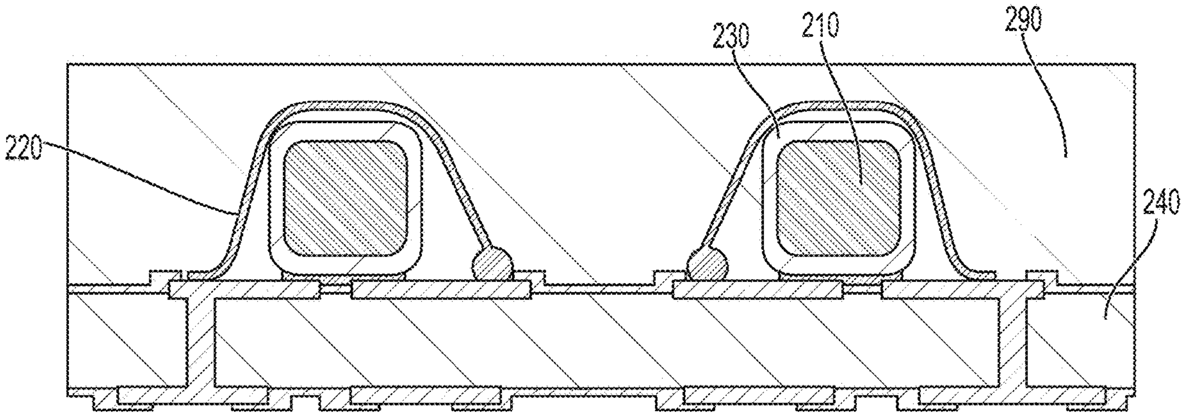
Figure 21:
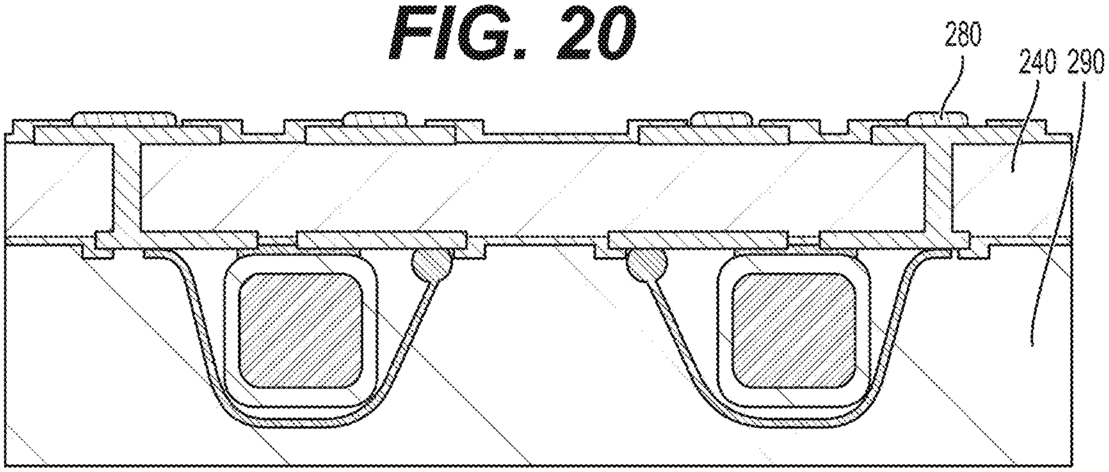
Figure 22:
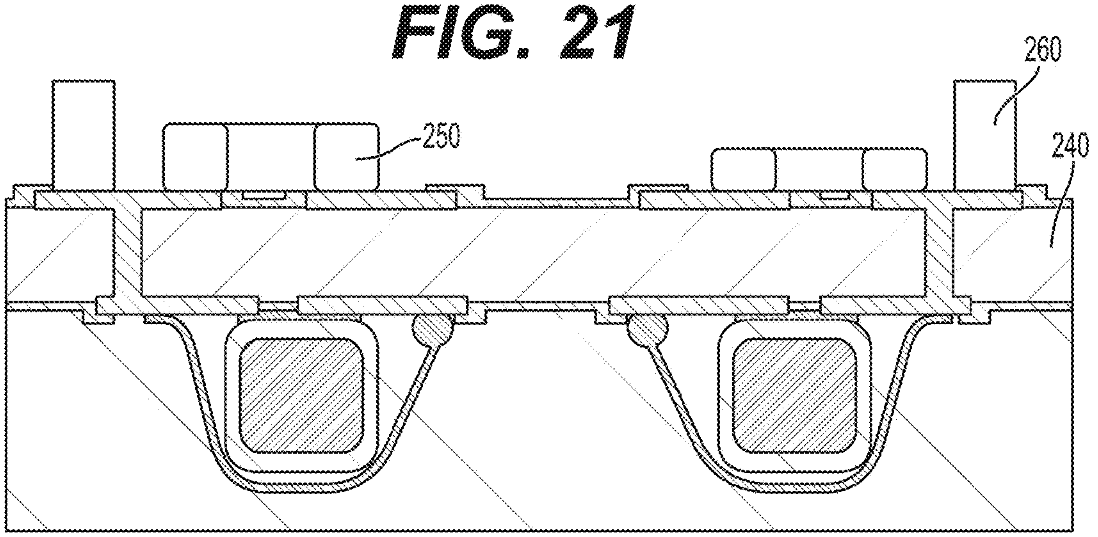
Figure 23:
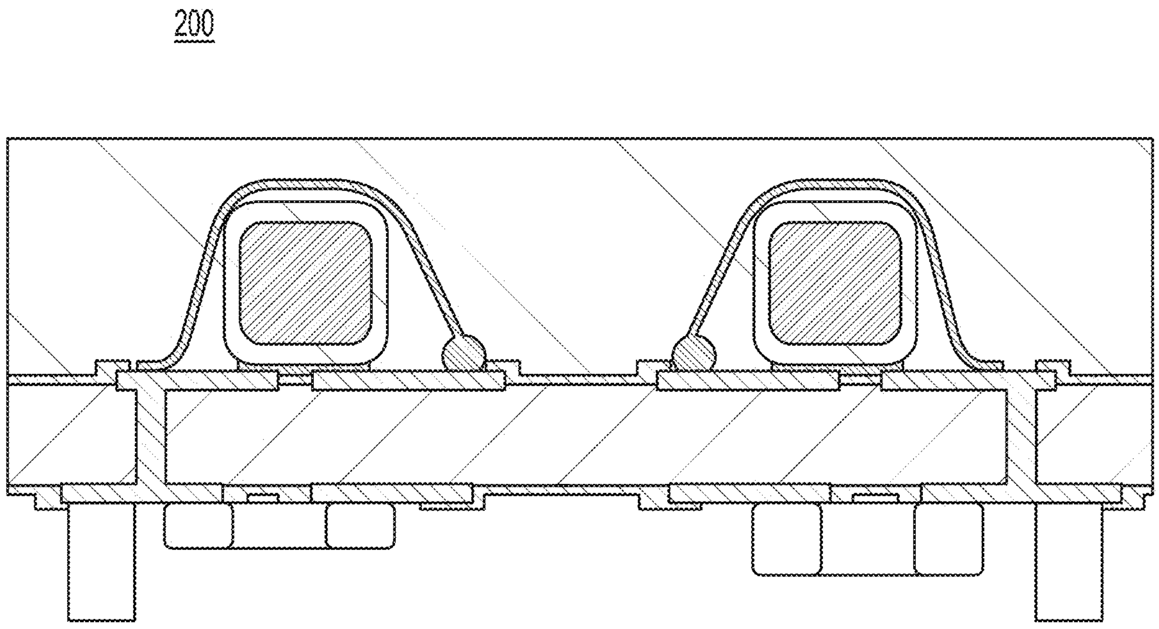

FIGS. 16-23 show steps of a method of manufacturing the magnetic-component module 200 shown in FIG. 15. FIG. 16 shows that the substrate 240, such as a PCB, can be provided with traces 245 on two opposing outer surfaces according to conventional techniques. FIG. 17 shows that an adhesive 270 can be deposited on portions of the surface of the substrate 240 on which the core 210 is to be mounted. FIG. 18 shows the core 210 that is covered on all sides by the spacer 230 can be adhered to the substrate 240 where the adhesive 270 was deposited. FIG. 19 shows that the wire bonds 220 can be formed such that the wire bonds 220 are attached to the substrate 240, extend over the core 210 covered by the spacer 230, and do not contact the core 210. FIG. 20 shows that an overmold material 290 can be overmolded to cover or encapsulate the core 210, the wire bonds 220, and the 230 spacer. FIG. 21 shows that solder 280 can be deposited on the substrate 240 on the opposite surface to the overmold material 290. FIG. 22 shows that the components 250 and the I/O pins 260 can be mounted on the substrate 240 using the solder 280. FIG. 23 shows the finished magnetic-component module 200 shown in FIG. 15.

Figure 24:
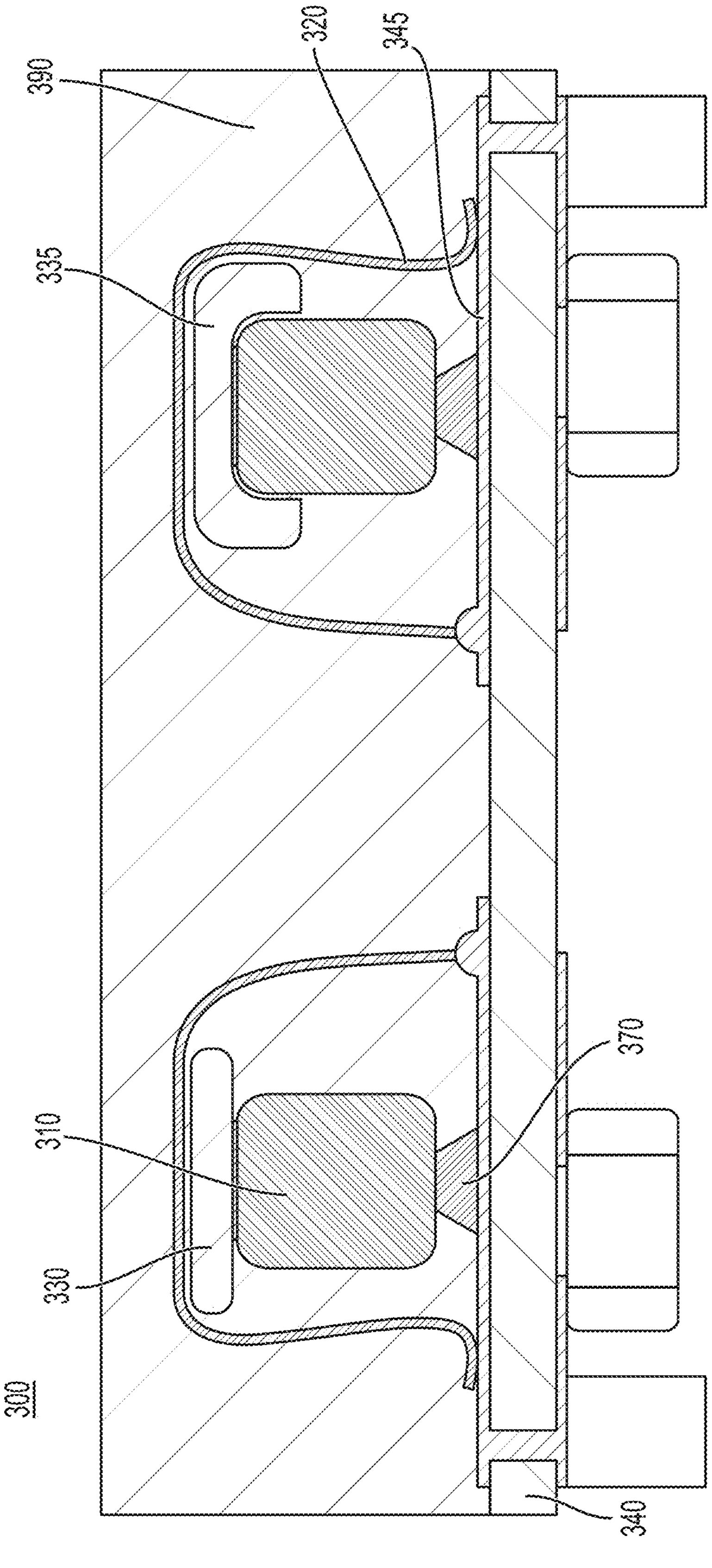
FIG. 24 shows a magnetic-component module with a core and a standoff.

As described above with respect to FIGS. 1 and 15, the core can be fixed to the top surface of the substrate. FIG. 24 shows an alternate arrangement of a magnetic-component module 300 in which an adhesive or glue layer 370 is thick enough to create a gap between the core 310 and the substrate 340 to allow the overmold material 390 to extend under the core 310 after bonding the wire bonds 320. The magnetic-component module 300 includes a core 310, winding(s) that are defined by wire bonds 320 and traces 345, a spacer 330, and a substrate 340. FIG. 24 shows a truncated conical shaped adhesive layer 370 provided under the core 310 that creates the gap between the core 310 and the substrate 340. The overmold material 390 can extend into the gap between the core 310 and the substrate 340, providing an additional insulation layer to strengthen the isolation barrier between the core 310 and the traces 345 on the top surface of the substrate 340. Because the overmold material 390 fills the gap between the core 310 and the substrate 340, it is not necessary to use a more expensive multilayer substrate, and it is possible to use a less expensive substrate 340 with no internal layers. But it is also possible to use a multilayer substrate in which the traces 345 defining the bottom half of the windings are located on the top surface or an internal layer of the multilayer substrate.

The left side of FIG. 24 shows an example of a spacer 330 between the top of the core 310 and the wire bonds 320 to prevent the wire from touching the core 310 and being short-circuited. As shown, the spacer 330 is wider than a width of the core 310 to create an overhang that maintains a predetermined distance between the wire bond 320 and the core 310. The right side of FIG. 24 shows an alternative configuration of the spacer 335 in which the spacer 335 conforms to the top portion of the core 310 and partially covers the side walls of the core 310. It should be understood that, typically, the spacer will have a single cross-sectional shape throughout the spacer and that the two different cross-sectional shapes shown in FIG. 24 are examples of possible cross-sectional shapes. FIGS. 29-34 show a magnetic-component module that uses the spacer 130 that is wider than the width of the core 110 to create an overhang.

As shown in FIG. 24, the magnetic-component module 300 can include surface-mount (SM) or input/output (I/O) pins 360 that are located on the bottom surface of the substrate 340. The magnetic-component module 300 can include electrical components 350 mounted on the bottom surface of the substrate 340. The electrical components 350 can include passive components, such as, capacitors, resistors, etc. and can include active components, such as transistors.

Figure 25:
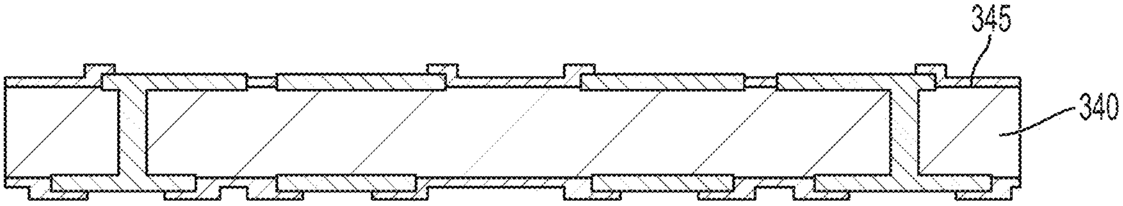
FIGS. 25-34 show steps of a method of manufacturing the magnetic-component module of FIG. 24.
Figure 26:
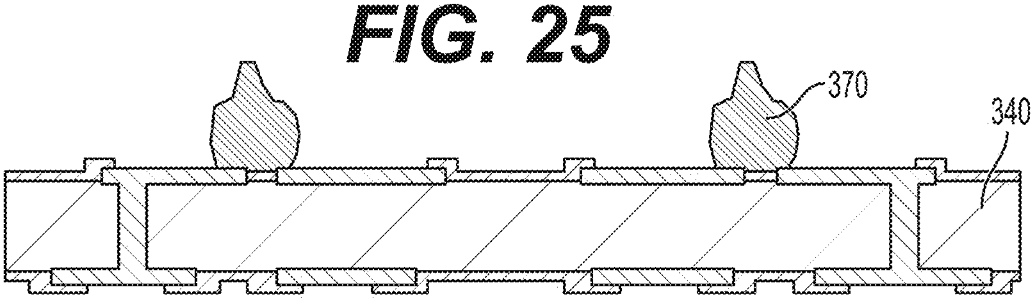
Figure 27:
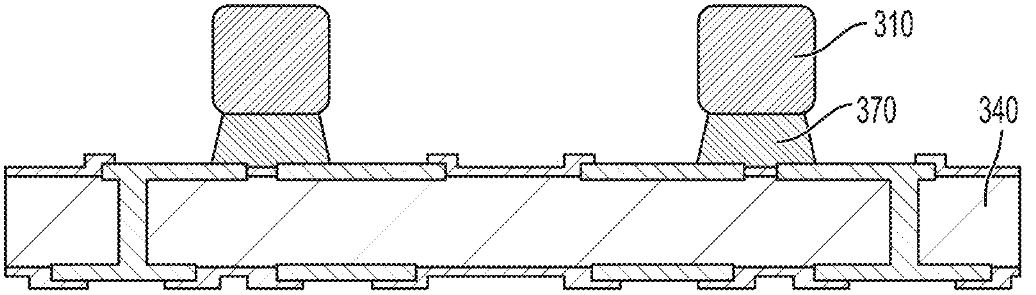
Figure 28:
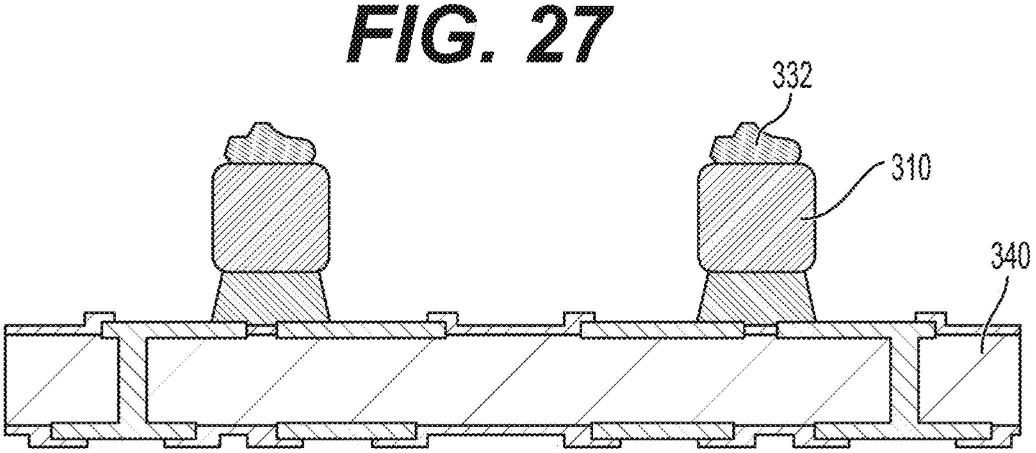
Figure 29:
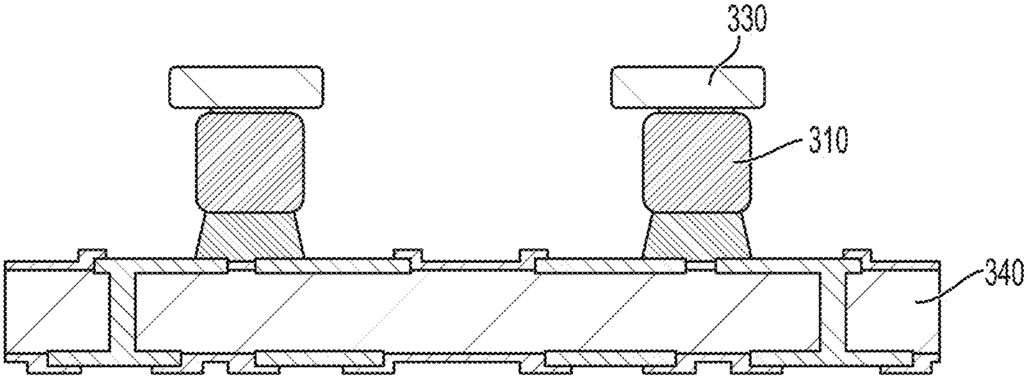
Figure 30:
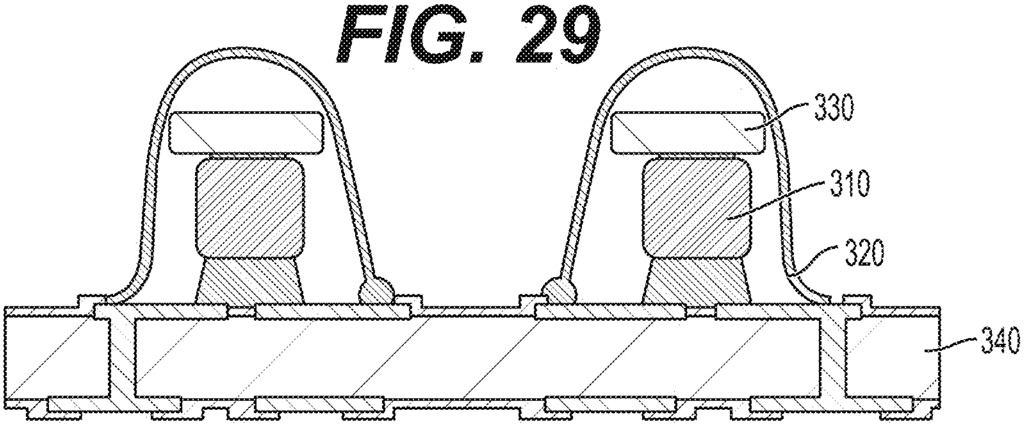
Figure 31:
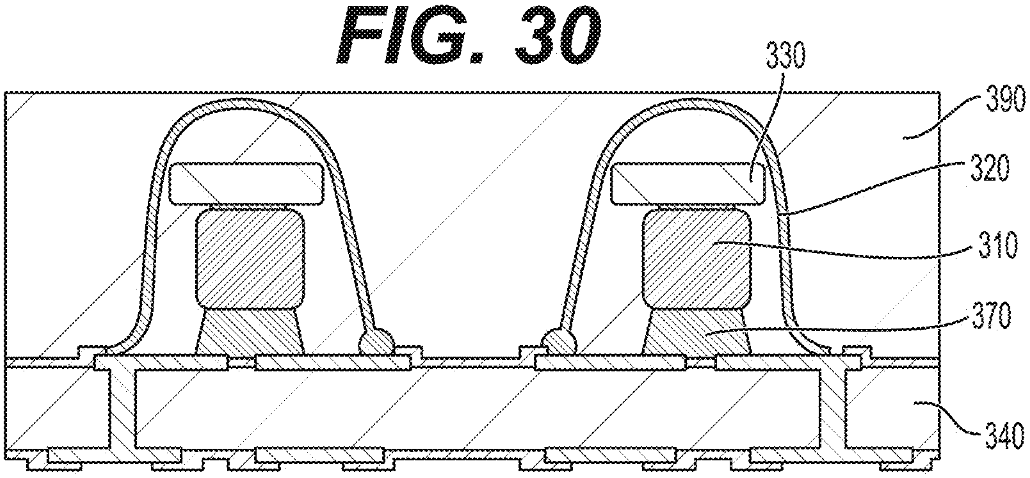
Figure 32:
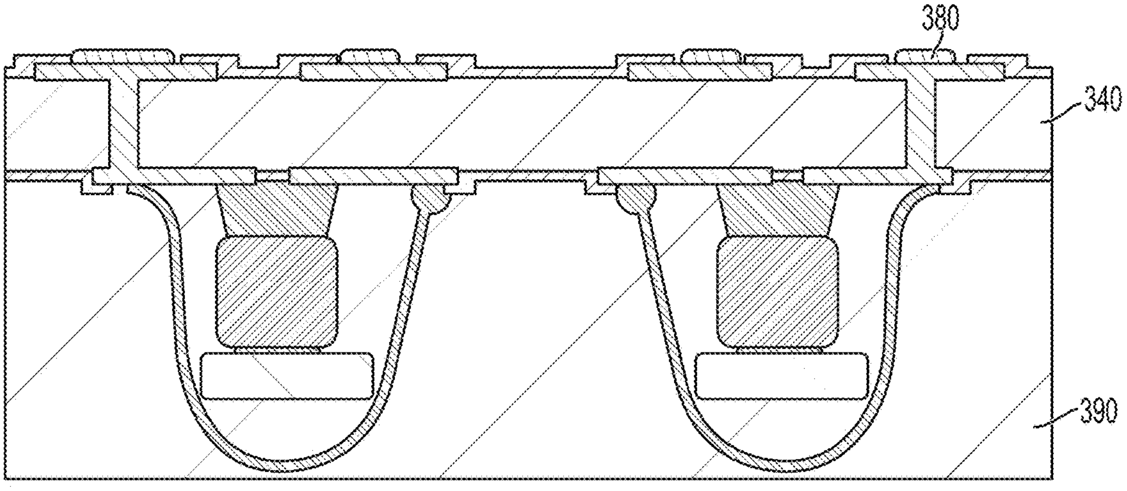
Figure 33:
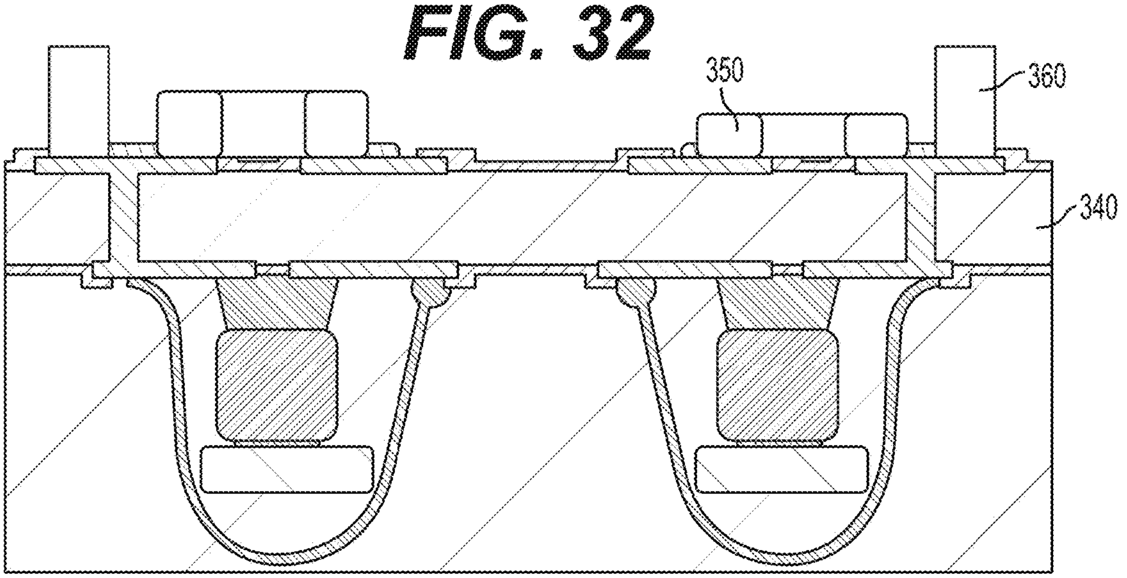
Figure 34:
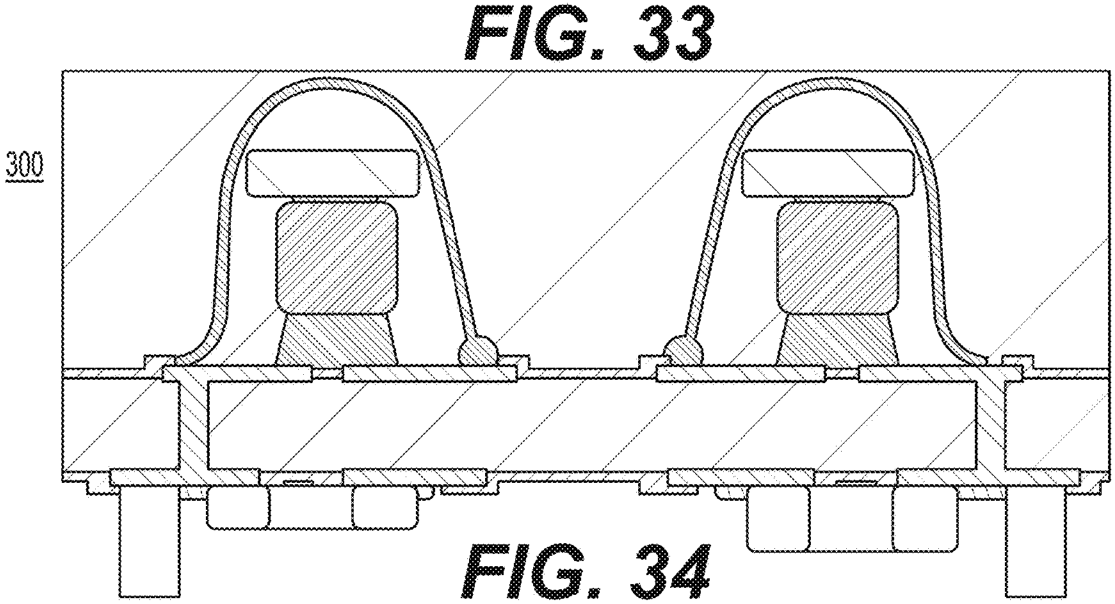

FIGS. 25-34 show steps of a method of manufacturing the magnetic-component module 300 shown in FIG. 24. FIG. 25 shows that the substrate 340, such as a PCB, can be provided with traces 345 on two opposing outer surfaces according to conventional techniques. FIG. 26 shows that an adhesive 370 can be deposited on portions of the surface of the substrate 340 on which the core 310 is to be mounted. FIG. 27 shows the core 310 can be adhered to the substrate 340 where the adhesive 370 was deposited. FIG. 28 shows that an adhesive 332 can be deposited on a top surface of the core 310. FIG. 29 shows that a spacer 330 can be adhered on the top surface of the core 310. FIG. 30 shows that the wire bonds 320 can be formed such that the wire bonds 220 are attached to the substrate 340, extend over the core 310 and the spacer 330, and do not contact the core 310. FIG. 31 shows that an overmold material 390 can be overmolded to cover or encapsulate the core 310, the wire bonds 320, the 330 spacer, and the adhesive 370. FIG. 32 shows that solder 380 can be deposited on the substrate 340 on the opposite surface to the overmold material 390. FIG. 33 shows that the components 350 and the I/O pins 360 can be mounted on the substrate 340 using the solder 380. FIG. 34 shows the finished magnetic-component module 300 shown in FIG. 24.

Figure 35:
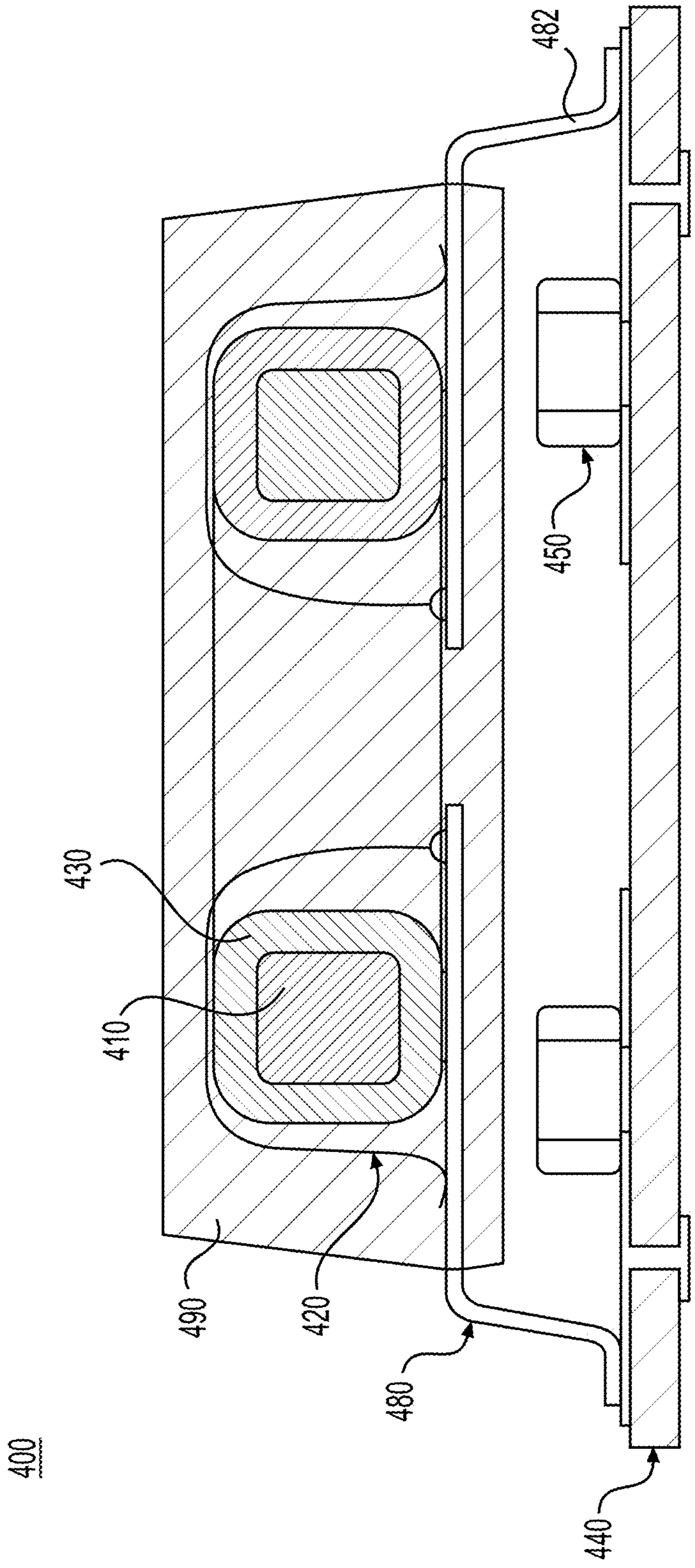
FIG. 35 shows a magnetic-component module with a lead frame.

FIG. 35 shows a magnetic-component module 400 with an overmolded core 410 and wire bonds 420 connected to a lead frame 480 instead of a substrate. FIG. 35 shows that the spacer 430 can surround the core 410, but other arrangements, as shown in the previous figures, are also possible. The lead frame 480 can be made from any suitable conductive material. The core 410 is supported by legs 482 of the lead frame 480. FIG. 35 also shows that the core 410, the wire bonds 420, and supporting portions of the lead frame 480 can all be overmolded. The legs 482 of the lead frame 480 can be mounted on a substrate 440 with a space created between the bottom of the overmold material 490 and the top surface of the substrate 440. The space between the overmold material 490 and the substrate 440 can be used to mount circuitry components 450 and other electronic components and to increase the surface area of the magnetic-component module 400 to facilitate cooling. Using the lead frame 480 can save space and increase circuit density. Although FIG. 35 shows a substrate 440 with no internal layers, it is also possible to use a multilayer substrate.

Figure 36:
FIGS. 36-43 show steps of a method of manufacturing the magnetic-component module of FIG. 35.
Figure 37:
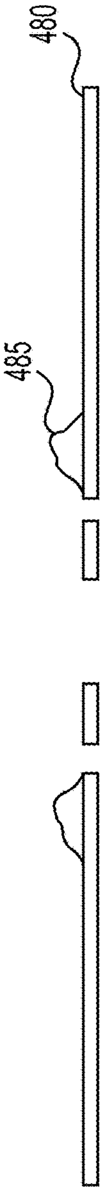
Figure 38:
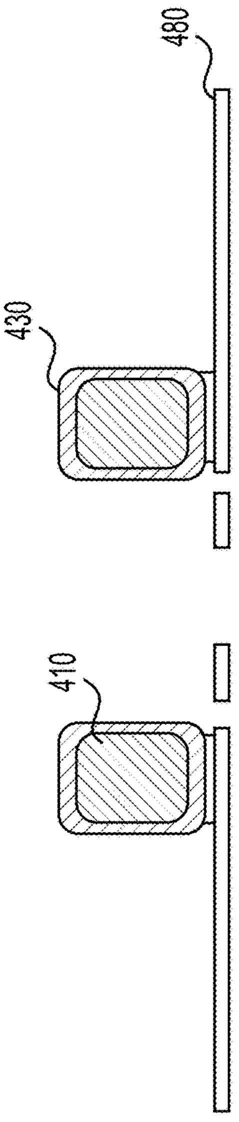
Figure 39:
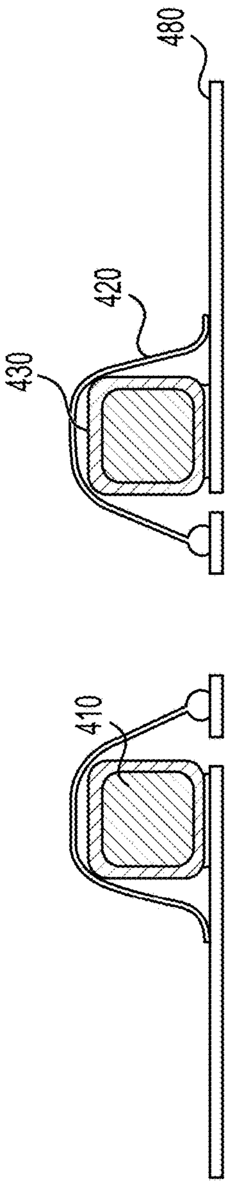
Figure 40:
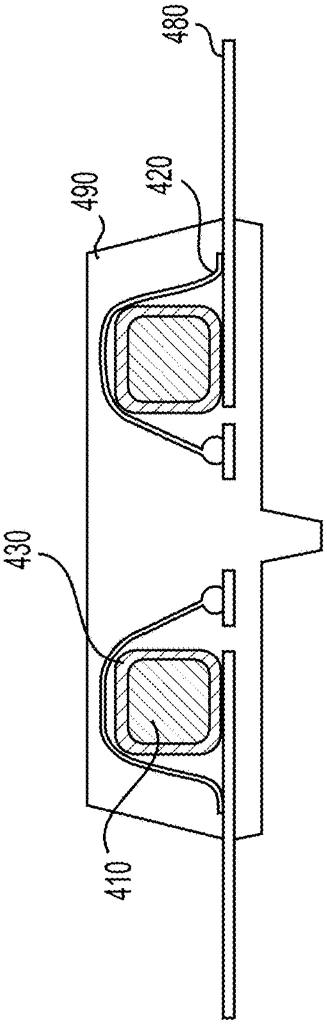
Figure 41:
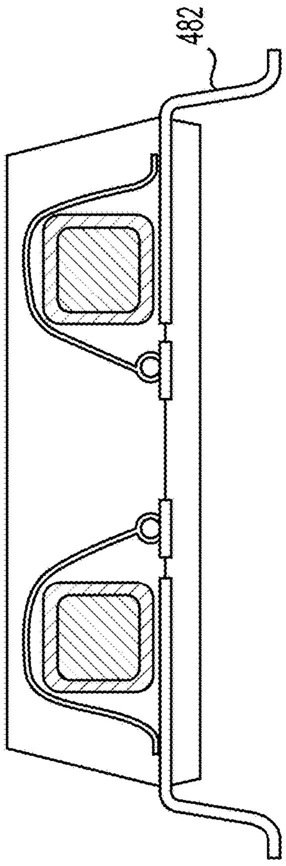
Figure 42:
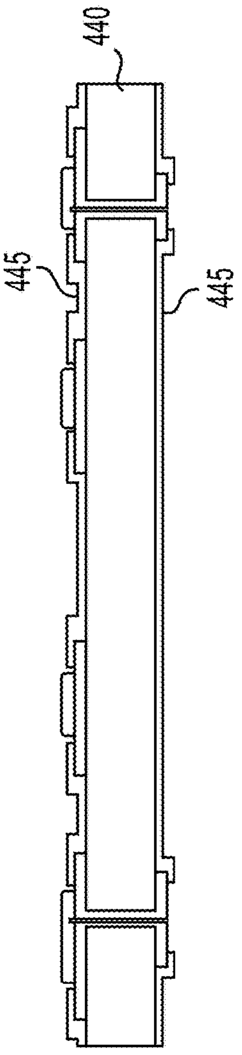
Figure 43:
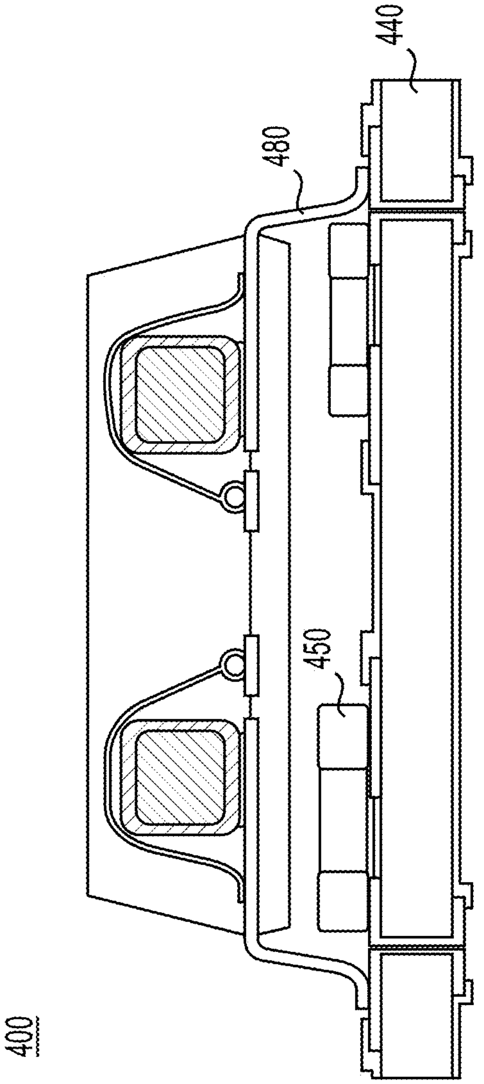

FIGS. 36-43 show steps of a method of manufacturing the magnetic-component module 400 shown in FIG. 35. FIG. 36 shows that a lead frame panel can be punched to form an unbent lead frame 480. FIG. 37 shows that an adhesive 485 can be deposited on portions of the surface of the lead frame 480 on which the core 410 is to be mounted. FIG. 38 shows the core 410 with surrounding spacer 430 can be adhered to the lead frame 480 where the adhesive 485 was deposited. FIG. 39 shows that the wire bonds 420 can be formed such that the wire bonds 420 are attached to the lead frame 480, extend over the core 410 and the spacer 430, and do not contact the core 410 but may contact the spacer 430. FIG. 40 shows that an overmold material 490 can be overmolded to cover or encapsulate the core 410, the wire bonds 420, the 430 spacer, and portions of the lead frame 480. FIG. 41 shows that portions of the lead frame 480 can be bent to form the legs 482. FIG. 42 shows that the two-layer substrate 440, such as a PCB, can be provided with traces 445 according to conventional techniques. FIG. 43 shows that circuitry components 450 and the overmolded transformer with lead frame 480 can be mounted on the substrate 440 using conventional soldering techniques to complete fabrication of the magnetic-component module 400.

Figure 44:
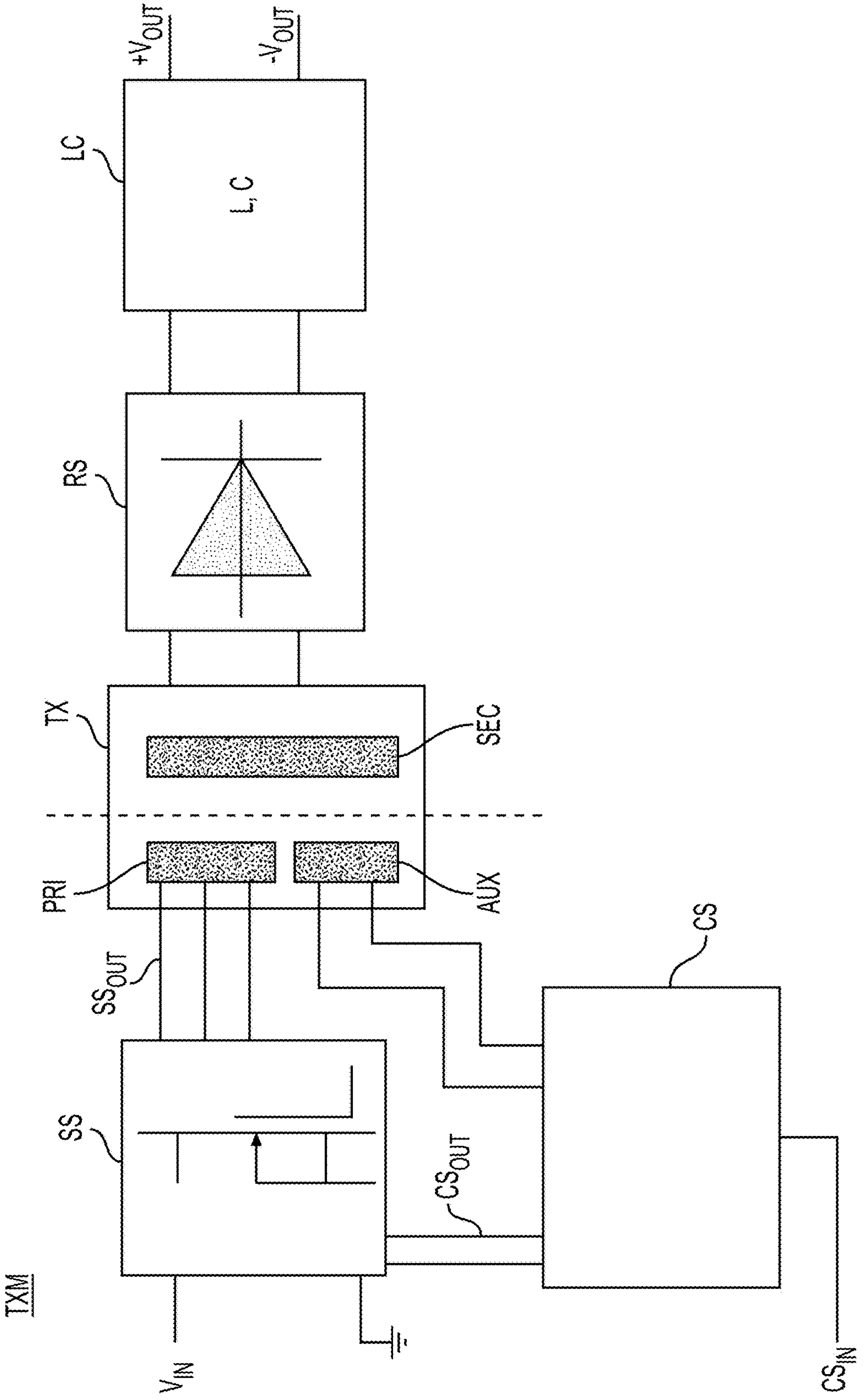
FIG. 44 is a block diagram of an example of an implementation of a magnetic-component module.

FIG. 44 is a block diagram of an example of an implementation of a magnetic-component module TXM. In FIG. 44, the magnetic-component module TXM is implemented as an isolated converter with the dashed line through the transformer TX showing the isolation boundary. The primary side that is on the left side of FIG. 44 and that is connected to the primary winding PR is isolated from the secondary side that is on the right side of FIG. 44 and that is connected to the secondary winding SEC. For example, FIG. 44 shows that the electronic module TXM can include a switching stage SS, a control stage CS, a transformer TX, a rectifier stage RS, and an output filter LC. The transformer TX can include the core and windings that are defined by wire bonds and traces as previously described. The circuitry and components other than the transformer TX can include other electronic components that are attached to the substrate or PCB on which the transformer TX is mounted, as previously described.

As shown in FIG. 44, the switching stage SS receives an input voltage Vin and outputs a voltage SSout to at least one primary winding PRI of the transformer TX. The switching stage can include switches or transistors that control the flow of power. The control stage CS includes an input control signal C Sin. The control stage CS can control the switching of the switches in the switching stage SS and can monitor the transformer TX via an auxiliary winding AUX. The dotted vertical line through the transformer TX represents the galvanic isolation between the primary winding PRI and the auxiliary winding AUX from the secondary winding SEC. The secondary winding of the transformer TX can be connected to a rectifier stage RS that in turn is connected to an output filter LC that outputs a DC voltage between +Vout and −Vout. The rectifier stage can include diodes and/or synchronous rectifiers that rectify the voltage at the secondary winding SEC. The output filter LC can include an arrangement of inductor(s) and capacitor(s) to filter unwanted frequencies.

Figure 45:
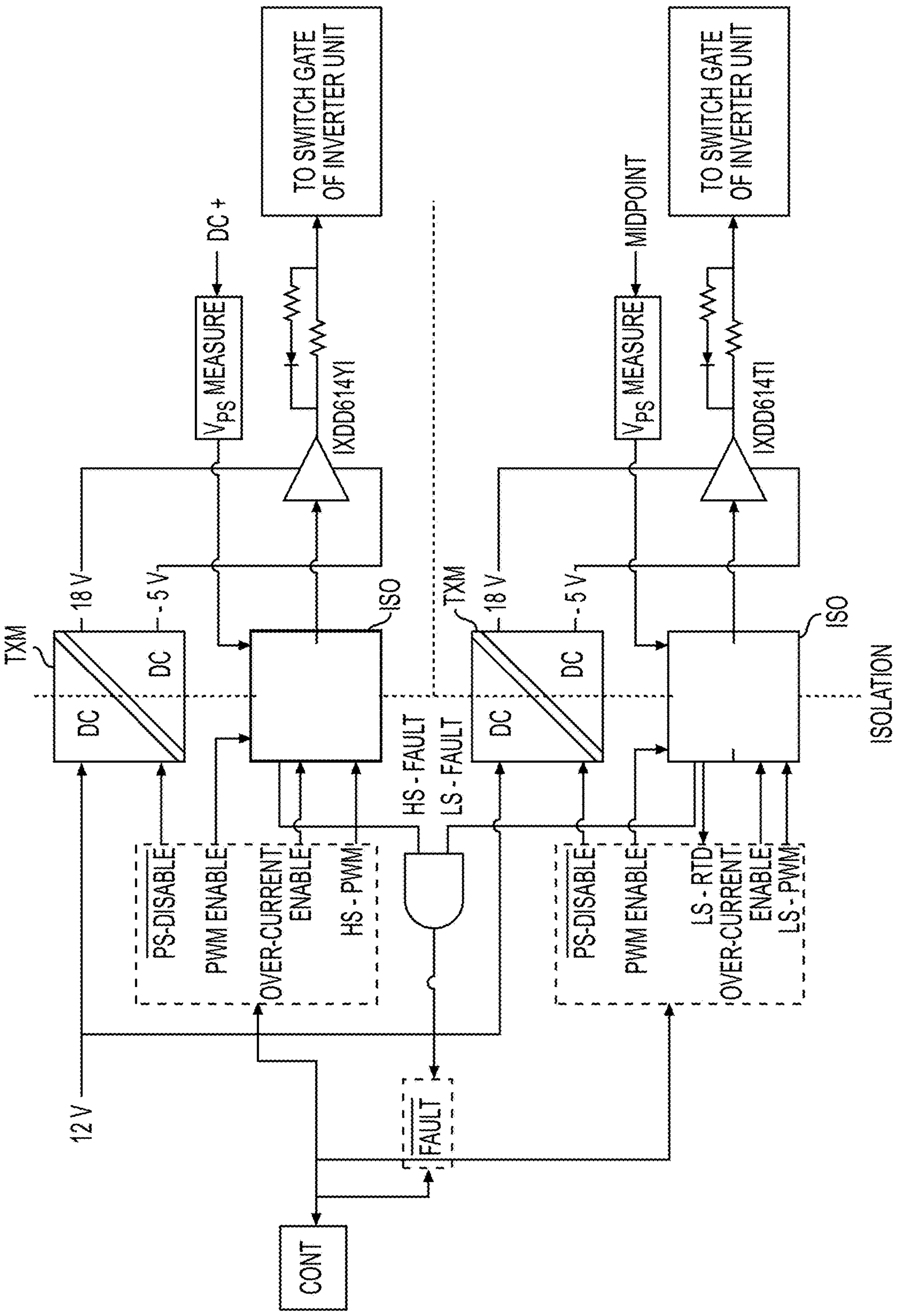
FIG. 45 is a block diagram of a gate-drive-circuit application including a magnetic-component module shown in FIG. 44.

FIG. 45 is a block diagram of a gate-drive-circuit application that can include one or more of the magnetic-component modules TXM shown in FIG. 44. The vertical and horizontal dotted lines represent galvanic isolation. FIG. 45 shows that the magnetic-component modules TXM can include, for example, a +12 Vdc input and −5 Vdc and +18 Vdc outputs, which could be used, for example, to drive metal-oxide-semiconductor field-effect transistor (MOSFETs) or insulated-gate bipolar transistors (IGBTs). The outputs of the magnetic-component modules TXM can be connected to gate driver IXDD614YI. A controller CONT can transmit and receive control signals represented by those control signals shown in the dotted-line boxes, including, for example, power-supply disable, pulse-width modulation PWM enable, low-side and high-side PWM, over-current detection, etc. The control signals can be transmitted and received between the controller CONT and the isolation circuitry ISO and between the controller CONT and the magnetic-component modules TXM. The isolation circuitry ISO can receive and transmit feedback signals $V_{DS}$ Measure. The isolation circuitry can include a transformer, a capacitor, an opto-coupler, a digital isolator, and the like. The output of the gate drive circuit can be connected to a gate of a switch located in an inverter-unit circuitry as a portion of an inverter for a motor control application as shown in FIG. 46.

Figure 46:
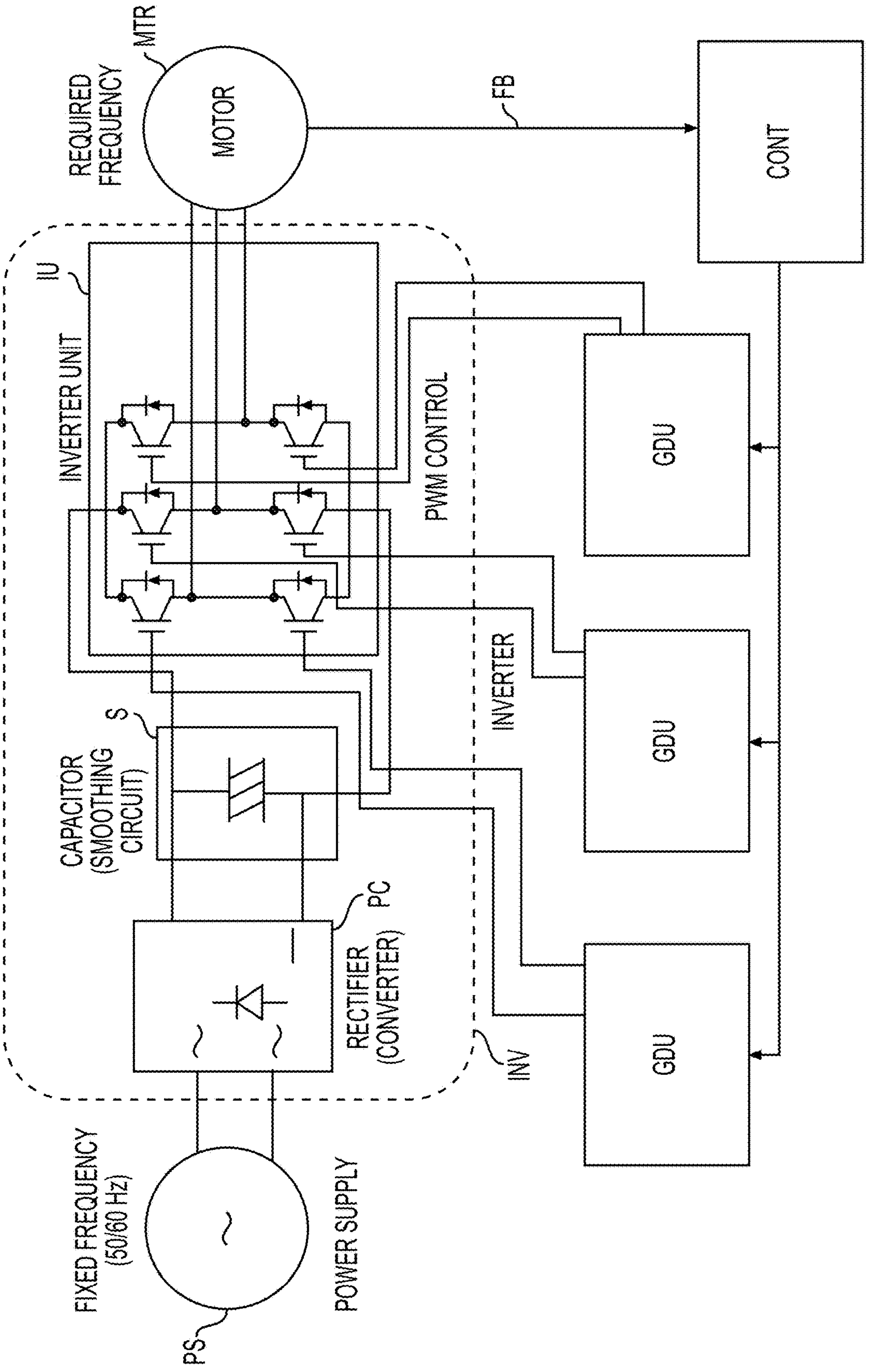
FIG. 46 shows circuitry for a motor control application.

FIG. 46 shows circuitry for a motor control application that can include a power supply PS running at a fixed frequency of 50 Hz or 60 Hz, for example, an inverter INV, and a motor MTR running at its required frequency. As shown, the inverter INV can include a power converter PC, a smoothing circuit S, and inverter unit circuitry IU controlled with PWM control. FIG. 46 shows that a controller CONT can be included to control the gate drive units GDU of FIG. 45. The gate drive units GDU can control the gates of the switches within the inverter unit circuitry IU. Feedback FB can be provided to the controller CONT from the motor MTR to stabilize control of the gate drive units GDU.

A package including the magnetic-component module can be any size. For example, the package can be about 12.7 mm by about 10.4 mm by about 4.36 mm. A package with these dimensions can provide higher isolation. The magnetic-component module can be used in many different applications, including, for example, industrial, medical, and automotive applications. For example, as explained above, the magnetic-component module can be included in a gate drive. The magnetic-component module can provide 1 W-2 W of power with an efficiency of greater than 80% and can provide 3 kV or 5 kV breakdown rating depending on the footprint of the magnetic-component module, for example. The magnetic-component module can include UL-required reinforced isolation and can operate at temperatures between about −40° C. and about 105° C. or between about −40° C. and about 125° C., for example. The magnetic-component module can have a moisture sensitivity level (MSL) of 1 or 2, for example, depending on the application. The magnetic component module can be used in battery management systems or programmable logic controller and data acquisition and communication compliant with RS484/232.

If the magnetic-component module includes a transformer, then, for example, the primary winding can include at least 20 turns and the secondary winding can include 12 turns. The coupling factor of the transformer can be 0.99, for example. The primary windings can have a direct-current resistance (DCR) of about 17.8 Ω/turn, and the secondary windings can have DCR of about 16.9 Ω/turn, for example. The maximum current can be 600 mA (over-current protection) with typical current being 300 mA, for example, to ensure that the magnetic-component module is not damaged in such over-current situations. The core can have an inner diameter of about 5.4 mm, an outer diameter of about 8.8 mm, and a height of about 1.97 mm, for example. The spacer can have an inner diameter of about 5.1 mm, an outer diameter of about 8.8 mm, and a height of about 0.2 mm, for example. The transformer can have size of about 12.7 mm by about 10.4 mm by about 2.5 mm, for example. The core can be made of any suitable material, including, for example, Mn—Zn, Ni—Zn, FeNi, and the like. The spacer can be made of any suitable material, including, for example, an epoxy adhesive. The wire bonds can be made of any suitable material, including, for example, Al or Cu. The pins can be made of any suitable material, including, for example, Cu with Ni—Sn coating. The overmold material can be made of any suitable material, including, for example, epoxy resin.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A magnetic-component module comprising:

a substrate;

a core on a first surface of the substrate;

a spacer on the core;

a gap between a bottom surface of the core and the first surface of the substrate;

a winding including:

wire bonds extending over the core and electrically connecting a first portion of the substrate and a second portion of the substrate; and traces on and/or in the substrate; and an overmold material encapsulating the core, the spacer, and the wire bonds and filling the gap.

2. The magnetic-component module according to claim 1, wherein electrical components are attached to a second surface of the substrate that is opposite to the first surface of the substrate.

3. The magnetic-component module according to claim 1, wherein the spacer conforms to a top of the core.

4. The magnetic-component module according to claim 1, wherein an edge of the spacer overhangs the core.

5. The magnetic-component module according to claim 1, wherein the spacer extends over an entire outer surface of the core or over substantially the entire outer surface of the core.

6. The magnetic-component module according to claim 1, further comprising a lead frame that supports the core and that electrically connects the winding to the substrate, wherein the overmold material encapsulates a portion of the lead frame.

7. The magnetic-component module according to claim 6, wherein the lead frame is configured such that electrical components are located on the substrate under the lead frame.

8. The magnetic-component module according to claim 1, further comprising an adhesive to mount the core to the substrate.

9. The magnetic-component module according to claim 1, wherein an adhesive is in the gap between the core and the substrate, and the overmold material encapsulates the adhesive.

10. The magnetic-component module according to claim 1, wherein the spacer includes a polyethylene terephthalate (PET) resin.

11. A voltage converter circuit comprising the magnetic-component module according to claim 1.

12. A gate drive switching circuit comprising the voltage converter circuit of claim 11.

13. A motor control circuit comprising the gate drive switching circuit of claim 12.

* * * * *